United States Patent
Kadambi et al.

(10) Patent No.: US 10,191,154 B2
(45) Date of Patent: Jan. 29, 2019

(54) METHODS AND APPARATUS FOR TIME-OF-FLIGHT IMAGING

(71) Applicant: Massachusetts Institute of Technology, Cambridge, MA (US)

(72) Inventors: Achuta Kadambi, Cambridge, MA (US); James Schiel, Goleta, CA (US); Ayush Bhandari, Cambridge, MA (US); Ramesh Raskar, Cambridge, MA (US); Vage Taamazyan, Moscow (RU)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/431,713

(22) Filed: Feb. 13, 2017

(65) Prior Publication Data
US 2017/0234985 A1     Aug. 17, 2017

Related U.S. Application Data

(60) Provisional application No. 62/294,277, filed on Feb. 11, 2016.

(51) Int. Cl.
*G01S 17/89* (2006.01)
*G01S 7/48* (2006.01)
(Continued)

(52) U.S. Cl.
CPC ............ *G01S 17/89* (2013.01); *G01S 7/4915* (2013.01); *G01S 17/10* (2013.01); *G01S 17/32* (2013.01); *G01S 17/325* (2013.01)

(58) Field of Classification Search
CPC ........ G01S 17/89; G01S 17/32; G01S 17/325; G01S 7/4808; G01S 7/4915; G01D 5/353;
(Continued)

(56) References Cited

U.S. PATENT DOCUMENTS 6,323,942 B1    11/2001   Bamji
6,515,740 B2    2/2003    Bamji et al.
(Continued)

OTHER PUBLICATIONS

Buttgen, B., et al., CCD/CMOS Lock-In Pixel for Range Imaging: Challenges, Limitations and State-of-the-Art; published in Proceedings of 1st Range Imaging Research Day (2005).
(Continued)

*Primary Examiner* — John H Le
(74) *Attorney, Agent, or Firm* — Stephen R. Otis

(57) ABSTRACT

In some implementations, scene depth is extracted from dual frequency of a cross-correlation signal. A camera may illuminate a scene with amplitude-modulated light, sweeping the modulation frequency. For each modulation frequency in the sweep, each camera pixel may measure a cross-correlation of incident light and of a reference electrical signal. Each pixel may output a vector of cross-correlation measurements acquired by the pixel during a sweep. A computer may perform an FFT on this vector, identify a dual frequency at the second largest peak in the resulting power spectrum, and calculate scene depth as equal to a fraction, where the numerator is the speed of light times this dual frequency and the denominator is four times pi. In some cases, the two signals being cross-correlated have the same phase as each other during each cross-correlation measurement.

20 Claims, 10 Drawing Sheets

(51) Int. Cl.
*G01S 17/32* (2006.01)
*G01S 17/10* (2006.01)
*G01S 7/491* (2006.01)

(58) Field of Classification Search
CPC ........... G01D 5/35303; G01D 5/35329; G01H 9/004; G01L 1/242
USPC .......... 702/73–77, 152, 159, 166; 250/208.1, 250/214.1; 257/431; 348/46; 356/4.91, 356/5.01
See application file for complete search history.

(56) References Cited

U.S. PATENT DOCUMENTS

| | | |
|---|---|---|
| 6,587,186 B2 | 7/2003 | Bamji et al. |
| 6,678,039 B2 | 1/2004 | Charbon |
| 6,777,659 B1 | 8/2004 | Schwarte |
| 6,825,455 B1 | 11/2004 | Schwarte |
| 7,012,738 B1 | 3/2006 | Schwarte |
| 7,060,957 B2 | 6/2006 | Lange et al. |
| 7,405,812 B1 | 7/2008 | Bamji |
| 7,636,150 B1 | 12/2009 | McCauley et al. |
| 7,719,662 B2 | 5/2010 | Bamji et al. |
| 8,194,233 B2 | 6/2012 | Bamji |
| 8,294,882 B2 | 10/2012 | Van Der Tempel et al. |
| 8,314,924 B2 | 11/2012 | Bamji et al. |
| 8,786,678 B2 | 7/2014 | Schmidt et al. |
| 8,953,149 B2 | 2/2015 | Bamji |
| 2005/0237811 A1 | 10/2005 | Xu et al. |
| 2006/0192086 A1 | 8/2006 | Niclass et al. |
| 2006/0197937 A1 | 9/2006 | Bamji et al. |
| 2007/0158770 A1 | 7/2007 | Kawahito |
| 2007/0182949 A1 | 8/2007 | Niclass |
| 2013/0300838 A1 | 11/2013 | Borowski |
| 2015/0120241 A1 | 4/2015 | Kadambi et al. |
| 2015/0211899 A1* | 7/2015 | Davidovic ............. G01L 1/242 385/13 |

OTHER PUBLICATIONS

Foix, S., et al., Lock-in Time-of-Flight (ToF) Cameras: A Survey; published in IEEE Sensors Journal, vol. 11, Issue 9 (Sep. 2011).

Lange, R., 3D Time-of-Flight Distance Measurement with Custom Solid-State Image Sensors in CMOS/CCD-Technology; PhD dissertation; University of Siegen (2000).

Niclass, C., et al., Single-Photon Synchronous Detection; published in IEEE Journal of Solid-State Circuits, vol. 44, Issue 7, pp. 1977-1989 (2009).

Payne, A., et al., Multiple frequency range imaging to remove measurement ambiguity; published in Proceedings of 9th Conference on Optical 3-D Measurement Techniques, Jul. 1-3, 2009, Vienna, Austria (pp. 139-148). Vienna, Austria: Vienna University of Technology.

Ringbeck, T., A 3D Time of Flight Camera for Object Detection; published in Optical 3-D Measurement Techniques, Jul. 9-12, 2007 ETH Zurich, Plenary Session 1: Range Imaging I (2007).

Spirig, T., et al., The Lock-In CCD—Two-Dimensional Synchronous Detection of Light; published in IEEE Journal of Quantum Electronics, vol. 31, Issue 9, pp. 1705-1708 (1995).

Hua, Y., et al., Matrix pencil method for estimating parameters of exponentially damped/undamped sinusoids in noise; published in IEEE Transactions on Acoustics, Speech, and Signal Processing, vol. 38, Issue 5 (May 1990 ).

Kalogeras, D., An Overview of the Spectral Estimation Methods; published in Recent Advances in Finite Differences and Applied & Computational Mathematics (2013).

Quinn, B., et al., A Fast Efficient Technique for the Estimation of Frequency; published in Biometrika, vol. 78, No. 3 (Sep. 1991), pp. 489-497.

Quinn, B., A Fast Efficient Technique for the Estimation of Frequency: Interpretation and Generalisation; published in Biometrika, vol. 86, No. 1 (Mar. 1999), pp. 213-220.

Fercher, A., et al., Measurement of intraocular distances by backscattering spectral interferometry; published in Optics Communications, vol. 117, Issues 1-2, pp. 43-48 (May 1995).

Fercher, A., et al., Optical coherence tomography—principles and applications; published in Reports on Progress in Physics, vol. 66, No. 2 (Jan. 2003).

Grasel, J., Exploring Frequency Domain OCT Systems; published at https://www.cs.hmc.edu/~jgrasel/writings/oct.pdf (2011).

Jimenez, D., et al., Modeling and correction of multipath interference in time of flight cameras; published in Image and Vision Computing 32 (2014) 1-13.

Schmitt, J., Optical coherence tomography (OCT): a review; published in IEEE Journal of Selected Topics in Quantum Electronics, vol. 5, Issue 4 (Jul./Aug. 1999 ).

* cited by examiner

METHODS AND APPARATUS FOR TIME-OF-FLIGHT IMAGING

RELATED APPLICATIONS

This application claims the benefit of U.S. Provisional Application No. 62/294,277, filed Feb. 11, 2016 (the "Provisional Application"), the entire disclosure of which is herein incorporated by reference.

STATEMENT REGARDING FEDERALLY SPONSORED RESEARCH OR DEVELOPMENT

This invention was made with Government support under Contract No. N00030-13-C-0005 awarded by the Department of the Navy. The Government has certain rights in the invention.

FIELD OF TECHNOLOGY

The present invention relates generally to time-of-flight cameras.

BACKGROUND

Conventional time-of-flight (ToF) cameras contain an active light-source that emits amplitude-modulated light (e.g., strobed light) that illuminates a scene. The optical signal returning to the camera sensor exhibits a shift in phase corresponding to the propagation distance of the signal, which allows object depth to be calculated. Thus, conventional time-of-flight (ToF) cameras rely on phase-sensing to determine object depths.

Unfortunately, conventional ToF cameras that measure phase shift in order to determine object depth ("phase-ToF cameras") suffer from at least three technological problems:

A first technological problem with conventional phase-ToF cameras is that phase is an ambiguous indicator of depth because of "phase-wrapping". The phenomenon of phase-wrapping occurs because phase is periodic and a modulo value: thus, the same phase will be observed whenever the optical path length is equal to a given distance plus an integer multiple of the wavelength of the amplitude modulation. For example, the same phase will be observed when the optical path length is equal to (i) a given distance, (ii) the given distance plus the wavelength of the amplitude modulation, or (iii) the given distance plus twice the wavelength of the amplitude modulation, A second technological problem with conventional phase-ToF sensors is multi-path interference. The phenomenon of multi-path interference ("MPI") occurs when a sensor pixel simultaneously receives light that has traveled different optical path lengths before reaching the pixel. MPI may occur, for example, if a pixel simultaneously receives both: (a) light that reflects multiple times before reaching the pixel (and thus travels a longer path) and; and (b) light that reflects only once before reaching the pixel (and thus travels a shorter path). Because light path distance affects the phase of light received by the ToF sensor, light that reflects multiple times before reaching the sensor tends to have a different phase at the sensor than that of light that reflects only once. The camera pixel measures the sum (superposition) of all light that it is receiving, and thus tends to measure a corrupted phase that is not the phase of the single-bounce light. As a result, multi-path interference tends to corrupt the object depth measured by a phase-ToF camera.

A third technological problem with conventional phase-ToF sensors is that they tend to be inaccurate when the signal-to-noise (SNR) is low.

SUMMARY

In illustrative implementations of this invention, these three technological problems are solved by determining optical path length from dual frequency of a cross-correlation signal.

First, a few definitions:

As used herein, "modulation frequency" means frequency of amplitude modulation of light. For example, if light with a wavelength of 650 nm is pulsed at a pulse rate of 50 MHz, then the modulation frequency of the light is 50 MHz.

As used herein, "carrier frequency" of light is equal to speed of the light divided by wavelength of the light. For example, red light that has a wavelength of 650 nm has a "carrier frequency" of 461 THz. Typically, modulation frequency is independent of carrier frequency.

More generally, frequency is cycles per unit of a primal domain. For example, if the primal domain of a given frequency is spatial distance, then the given frequency is cycles per unit of spatial distance, which is commonly known as spatial frequency.

As used herein, "temporal frequency" is a frequency that is with respect to a primal domain of time. Because the primal domain of temporal frequency is time, the units of temporal frequency are in cycles per unit of time. For example, temporal frequency may be expressed in units of Hertz, that is, as cycles/second. Modulation frequency and carrier frequency are each a non-limiting example of temporal frequency.

As used herein, "dual frequency" means a frequency that has units of time—or equivalently, that has units of cycles per unit of temporal frequency. Thus, the primal domain of a dual frequency is temporal frequency. The units of a "dual frequency" are units of time. For example, a dual frequency may be expressed in units of cycles/Hz=cycles/(cycles/second)=seconds.

If a vector encodes a discrete-valued signal indexed over a domain, then the domain is sometimes referred to herein as the primal domain of the signal. To provide examples of the foregoing terminology: If a vector encodes a first signal that is discrete-valued and indexed over time, then: (a) the primal domain of the first signal is time; (b) the dual domain of the first signal is a frequency domain transform of the first signal; and (c) the dual domain of the first signal has units of cycles per unit of time. If a vector encodes a second signal that is discrete-valued and indexed over temporal frequency, then: (a) the primal domain of the second signal is temporal frequency (e.g., Hz); (b) the dual domain of the second signal is a frequency domain transform of the second signal; (c) the dual domain of the second signal has units of time; and (d) a dual frequency of the second signal has units of time.

In illustrative implementations of this invention, a ToF camera may extract, from a dual frequency of a signal, the optical path length of light that strikes a camera pixel, where: (1) the signal comprises cross-correlation measurements that are taken by the pixel during a sweep of modulation frequency; and (2) the modulation frequency is that of amplitude-modulated light which is emitted by an active light source of the camera and which reflects from the scene back to the pixel.

In illustrative implementations of this invention, an active light source of a camera may emit amplitude-modulated light. This light may illuminate, and reflect back from, a scene. The modulation frequency of the light may be swept. For each modulation frequency in the sweep, each pixel of the camera may measure a cross-correlation of two signals, where: (a) the first signal is light that is incident on the pixel; and (b) the second signal is a reference electrical signal that is applied to the pixel and that has the same temporal frequency (and in some cases the same phase) as the amplitude modulation by the active light source.

Thus, for each sweep of the modulation frequency, each pixel in the ToF camera may output a vector of cross-correlation measurements. This vector may include at least one cross-correlation measurement for each modulation frequency in the sweep. A discrete-valued signal that is encoded by a vector of cross-correlation measurements for a pixel for a sweep of modulation frequencies is sometimes referred to herein as a "received signal" or a "cross-correlation signal".

In illustrative implementations, each element in a vector that encodes a cross-correlation signal is a scalar value representing a cross-correlation.

In illustrative implementations, one or more computers analyze the cross-correlation signal for a pixel in a frequency domain (e.g., by a discrete Fourier transform or other spectral analysis).

In illustrative implementations of this invention, optical path length for light striking a ToF camera pixel may be extracted from dual frequency of the cross-correlation signal for the pixel.

In illustrative implementations, this invention may solve—or completely avoid—the three technological problems discussed above.

The first technological problem mentioned above is "phase-wrapping". In illustrative implementations of this invention, a ToF camera extracts optical path length from dual frequency of a cross-correlation signal. The physical phenomenon of modulo "phase-wrapping" does not impact measurements of frequency, and thus does not impact estimates of path length, in illustrative implementations of this invention.

The second technological problem discussed above is multi-path interference (MPI). In illustrative implementations of this invention, MPI does not corrupt path length measurements, because a ToF sensor extracts optical path length from dual frequency of a cross-correlation signal. Thus, the fact that MPI would corrupt phase measurements is irrelevant. In illustrative implementations of this invention, if multi-path interference (MPI) is occurring at a given pixel due to light simultaneously reaching the pixel along multiple light paths, a computer: (a) may detect multiple dual frequencies of the cross-correlation signal, where each respective dual frequency is due to the contribution of light that travels along one of the respective paths; (b) may calculate path length of the path for single-bounce light, and (c) optionally, may also calculate path length for one or more of the multi-bounce paths, respectively. Alternatively, if MPI is occurring at a pixel, a computer may simply identify the dual frequency (of the cross-correlation signal) that is due to single-bounce light striking the pixel, and calculate optical path length of single-bounce light from this dual frequency. Either way, in these illustrative implementations, a frequency-based approach resolves MPI.

The third technological problem discussed above is that a conventional phase-ToF sensor is unable to measure path length in an extremely low SNR environment. Experiments on a prototype of this invention shows that this prototype accurately measures optical path length even in an extremely low SNR environment.

In the preceding discussion, the ToF camera extracts optical path length from dual frequency of a cross-correlation signal. Alternatively, the camera may extract scene depth from dual frequency, or may extract both scene depth and path length from dual frequency. The depth of a scene point that corresponds to a given pixel is equal to one half of the path length of single-bounce light for the given pixel. This is because single-bounce light travels from the active light source in the camera to a scene point, and then back to the camera, and thus travels a distance that is equal to twice the depth of the scene point.

Here is a non-limiting example of extracting path length (and scene depth) from dual frequency, in an illustrative implementation of this invention: A light source may emit light that illuminates a scene and that is amplitude-modulated at modulation frequency $f_M$. The modulation frequency may be swept over three or more values of $f_M$. A camera may measure reflected light from the scene, during the sweep of modulation frequency $f_M$. Each pixel in the camera may output a vector of measurements that are taken during the sweep. Each measurement in this vector may be a measured cross-correlation for a given modulation frequency $f_M$. For each camera pixel, a computer may perform a Fast Fourier Transform (FFT) on the vector of measurements by the pixel. The FFT may output a power spectrum for the pixel. For each pixel, the computer may calculate the dual frequency $\gamma$ at the second highest peak in the power spectrum (since the highest peak corresponds to the so-called "DC" component of the signal encoded by the vector of measurements). For each pixel, the computer may use this dual frequency $\gamma$ to calculate the optical path length Z for single-bounce light that reflects to the pixel. Specifically, the computer may calculate $$z = \frac{c\gamma}{2\pi},$$

where c is the speed of light. Alternatively or in addition, for each pixel, the computer may use this dual frequency $\gamma$ to calculate the depth d of a scene point that corresponds to the pixel, where $$d = \frac{z}{2} = \frac{c\gamma}{4\pi}.$$

In the preceding example, a computer performs an FFT. However, this invention is not limited to Fourier transforms. This invention may be implemented with any method of spectral analysis, such as the Matrix Pencil algorithm for spectral analysis or the Quinn-Fernandes algorithm for spectral analysis. For example, a computer may employ a spectral analysis technique for each pixel, to identify a "tone" (dual frequency $\rho$) of the cross-correlation signal produced by the pixel. For each pixel, the computer may use this dual frequency $\rho$ for the pixel to calculate the optical path length Z for single-bounce light that reflects to the pixel. Specifically, the computer may calculate $$z = \frac{c\rho}{2\pi},$$

where c is speed of light. Alternatively or in addition, for each pixel, the computer may use this dual frequency ρ to calculate the depth d of a scene point that corresponds to the pixel, where $$d = \frac{z}{2} = \frac{c\rho}{4\pi}.$$

In some cases, the FFT method described in the preceding paragraph may comprise a special example of the method described in the present paragraph.

In illustrative implementations, each sweep of modulation frequency includes three or more modulation frequencies. For example, in some implementations, the number of modulation frequencies in each sweep is (a) greater than or equal to three but less than ten, (b) greater than or equal to 10 but less than 20, (c) greater than or equal to 20 but less than 30, (d) greater than or equal to 30 but less than 40, (d) greater than or equal to 40 but less than 50, (3) greater than or equal to 50 but less than 100; or (f) greater than 3, 4, 5, 6, 7, 8, 9, 10, 20, 30, 40, 50, 60, 70, 80, 90, or 100. In the presence of noise, it may be desirable to include more than three modulation frequencies in each sweep, in order to achieve accurate estimation of optical path length and scene depth.

As used herein, the terms "frequency-domain time-of-flight camera" or "FD-TOF camera" are sometimes used to refer to a ToF camera that extracts, for each pixel of the camera, optical path length of light that strikes the pixel (or depth of a scene point that corresponds to the pixel) from dual frequency of a discrete-valued signal encoded by a vector of cross-correlation measurements taken by the pixel during a sweep of modulation frequency of the light. As used herein, the term "FD-TOF sensing" means sensing of optical path length or scene depth by a FD-TOF camera.

The Summary and Abstract sections hereof: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the description of this invention in the Field of the Technology section is not limiting; instead it identifies, in a general, non-exclusive manner, a field of technology to which some implementations of this invention generally relate.

BRIEF DESCRIPTION OF THE DRAWINGS

In FIG. 7C, the modulation frequency of incident light is twice that in FIG. 7B, and is four times that in FIG. 7A.
FIG. 8 provides details about hardware of the pixel and about different voltage gradients produced in the pixel.

FIG. 9 shows how the pixel performs an analog computation that effectively calculates a cross-correlation.

Figure 1:
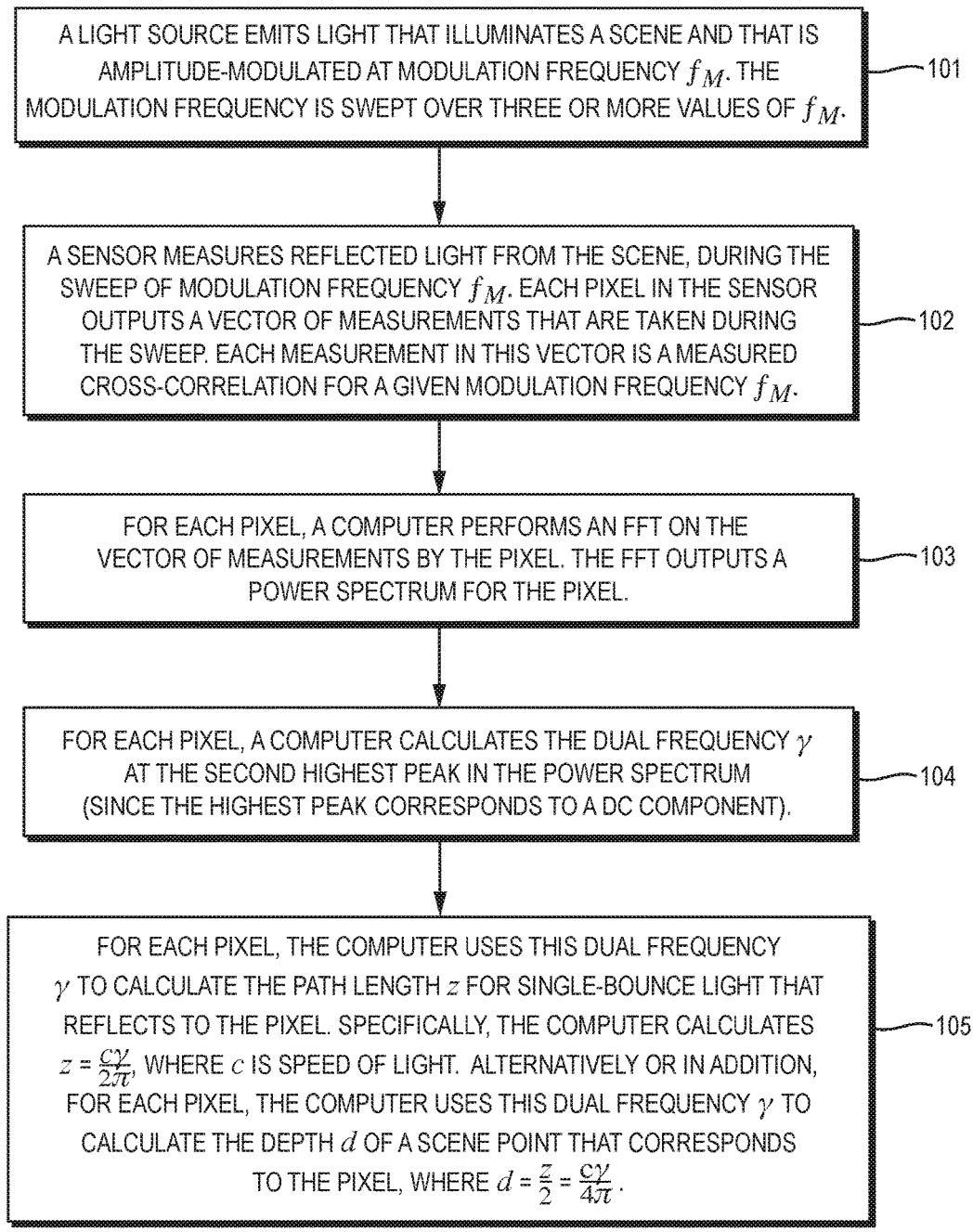
FIG. 1 is a flowchart for an example of ToF sensing.

The above Figures show some illustrative implementations of this invention, or provide information that relates to those implementations. The examples shown in the above Figures do not limit this invention. This invention may be implemented in many other ways.

DETAILED DESCRIPTION

In illustrative implementations of this invention, a ToF camera measures optical path length and scene depth on a pixel-by-pixel basis. A "path" means a route that light travels (e.g., from a camera's active light source to a pixel of the ToF camera). Unless the context clearly indicates otherwise, "path length" means optical path length. To say that light travels in a "single-bounce path"- or to say that the light is "single-bounce light"—means that the light reflects only once during the path from the light source of a camera to a sensor pixel of the camera. Thus, single-bounce light travels directly from the active light source of a camera to a scene point, and then reflects directly from the scene point to a camera pixel. To say that light travels in a "multi-bounce path"- or to say that the light is "multi-bounce light"— means that the light reflects multiple times during the path from the light source of a camera to a sensor pixel of the camera. For example, in some cases, multi-bounce light may travel from the camera's active light source, then reflect off a first scene point, then reflect off a second scene point, and then reflect off a third scene point, and then travel directly to a pixel of the camera.

In illustrative implementations, optical path length (and thus depth of a scene point) may be estimated from samples of cross-correlation taken at different modulation frequencies. Throughout the sampling period(s) for each given modulation frequency in the sweep, the phase and temporal frequency of the reference signal (that is applied to camera pixels) may be identical to the phase and temporal frequency, respectively, of the amplitude modulation by the light source. However, during the sweep, the modulation frequency may change in discrete steps. For example, at all times while one or more cross-correlation samples are gathered at a first modulation frequency, the phase and temporal frequency of the reference signal (that is applied to the camera pixels) may be identical to the phase and temporal frequency, respectively of the amplitude modulation by the light source. Then, the modulation frequency may change to the second modulation frequency in the sweep. Then, at all times while one or more cross-correlation samples are gathered at the second modulation frequency, the phase and temporal frequency of the reference signal may be identical to the phase and temporal frequency, respectively of the amplitude modulation by the light source. But the second modulation frequency will be different than the first modulation frequency, and thus, in many cases, the phase at the second modulation frequency will be different than the phase at the first modulation frequency. Then the modulation frequency may change to a third modulation frequency in the sweep. And so on.

Alternatively, at all times while cross-correlation samples are gathered for a given modulation frequency, a non-zero phase difference may be constant, where the phase difference is between the reference signal (that is applied to the camera pixels) and the amplitude modulation of light by the light source. The phase difference may change from one modulation frequency to another, but may remain constant for any given modulation frequency.

General Model

The following general model (described in this "General Model" section) provides a helpful insight into operation of a frequency domain time-of-flight camera (FD-TOF camera), in some implementations of this invention.

In some implementations, the optical path length Z of light striking a pixel may be modeled as follows:

$$\mathcal{F}[c(\tau, f_M)](\kappa) \propto \delta(\kappa) + \delta\left(\kappa \pm \frac{2\pi z}{c}\right), \quad \text{(Equation 1)}$$

where: (1) $f_M$ is modulation frequency of amplitude-modulated light that is emitted by the camera's active light source; (2) $c(\tau, f_M)$ is cross-correlation of a first signal and a second signal, where the first signal is light incident on the pixel and the second signal is an electrical reference signal that is applied to the pixel, and where $\tau$ is lag between the first and second signals and $f_M$ is the temporal frequency of the first and second signals in the case of homodyne detection; (3) $\mathcal{F}[\bullet]$ is the discrete Fourier transform operator; (4) $\delta(\bullet)$ is the Dirac delta function; (5) C is the speed of light; (6) $\kappa$ is dual frequency in a Fourier domain version of $c(f_M)$; and (7) $\infty$ means "is proportional to".

For example, in some implementations, the path length Z of light striking a pixel may be calculated in accordance with Equation 1, such as by finding the location of the support in the Fourier domain. As used herein, the "support" of a function is the set of points where the function is not zero-valued.

Model for Multi-Path Interference

The following model (described in this "Model for Multi-Path Interference" section) provides a helpful insight into how, in some implementations, this invention may resolve multi-path interference.

In illustrative implementations, an advantage of determining depth from dual frequency is that multi-path interference does not corrupt measurements of path length.

In some cases, multi-path interference occurs, such that K reflections return to the sensor and the cross-correlation signal is given by $$c(\tau, f_M) = \frac{1}{2}\left(\sum_{l=1}^{K} \alpha_l \cos\left(\frac{2\pi z_l}{c} f_M\right)\right) + \beta \quad \text{(Equation 2)}$$

where $Z_l$ is the path length for reflection l, $\alpha_l$ is the modulation amplitude for reflection l, and $\beta$ is a "DC" component.

The associated Fourier transform may now be written as $$\mathcal{F}[c(\tau, f_M)](\kappa) \propto \delta(\kappa) + \sum_{l=1}^{K} \alpha_l \delta\left(\kappa \pm \frac{2\pi z_l}{c}\right) \quad \text{(Equation 3)}$$

In Equation 3, the multi-path signal is a sum of sinusoids at the same phase but at different frequencies. In some cases of this invention, a Fourier transform is taken in order to resolve multi-path interference.

Depth Resolution

In some implementations of this invention, the depth resolution (i.e., spatial resolution along the depth axis) of the camera is equal to $0.603c/\Delta f_M$, where $\Delta f_M = f_M^+ - f_M^-$ and where $f_M^-$ and $f_M^+$ represent the minimum and maximum modulation frequencies, respectively, that are sampled. Thus, in some implementations, the greater the modulation frequency bandwidth (that is, the difference between the highest and lowest modulation frequencies that are sampled in a sweep), the greater the depth resolution of the camera. For example: (a) in some implementations, the modulation frequency bandwidth $\Delta f_M$ is greater than 100 MHz, and thus the depth resolution of the camera is less than 1.8 meters; (b) in some implementations, the modulation frequency bandwidth $\Delta f_M$ is greater than 100 GHz, and thus the depth resolution of the camera is less than 1.8 millimeters; and (c) in some implementations, the modulation frequency bandwidth $\Delta f_M$ is greater than 100 THz, and thus the depth resolution of the camera is less than 1.8 micrometers.

For many implementations (e.g., in many entertainment use scenarios), it is desirable for the modulation frequency bandwidth $\Delta f_M$ to be greater than or equal to 30 MHz. Alternatively, this invention may be implemented with a bandwidth $\Delta f_M$ that is less than 30 MHz.

In some implementations, a ToF camera may disentangle multi-path interference (MPI) at a pixel. This MPI may be caused by light traveling along multiple paths (to the pixel) that have different path lengths. In some implementations, the camera may distinguish between different path lengths if the difference in optical path lengths (e.g., the difference between the optical path length of a first path and the optical path length of a second path) is greater than or equal to $1.206c/\Delta f_M$. For example: (a) in some implementations, the modulation frequency bandwidth $\Delta f_M$ is greater than 100 MHz, and thus multipath interference may be disentangled in a frequency domain if the optical paths differ in length by more than 3.6 meters; (b) in some implementations, the modulation frequency bandwidth $\Delta f_M$ is greater than 100 GHz, and thus multipath interference may be disentangled in a frequency domain if the optical paths differ in length by more than 3.6 millimeters; and (c) in some implementations, the modulation frequency bandwidth $\Delta f_M$ is greater than 100 THz, and thus multipath interference may be disentangled in a frequency domain if the optical paths differ in length by more than 3.6 micrometers.

Extracting Path Length from Dual Frequency

FIG. 1 is a flowchart for ToF sensing, in an illustrative implementation of this invention. In the example shown in FIG. 1, the method includes the following steps: A light source emits light that illuminates a scene and that is amplitude-modulated at modulation frequency $f_M$. The modulation frequency is swept over three or more values of $f_M$ (Step 101). A sensor measures reflected light from the scene, during the sweep of modulation frequency $f_M$. Each pixel in the sensor outputs a vector of measurements that are taken during the sweep. Each measurement in this vector is a measured cross-correlation for a given modulation frequency $f_M$ (Step 102). For each pixel, a computer performs an FFT on the vector of measurements by the pixel. The FFT outputs a power spectrum for the pixel (Step 103). For each pixel, the computer calculates the dual frequency γ at the second highest peak in the power spectrum (since the highest peak corresponds to a DC component) (Step 104). For each pixel, the computer uses this dual frequency γ to calculate the path length z for single-bounce light that reflects to the pixel. Specifically, the computer calculates $$z = \frac{c\gamma}{2\pi},$$

where c is speed of light. Alternatively or in addition, for each pixel, the computer uses this dual frequency γ to calculate the depth d of a scene point that corresponds to the pixel, where $$d = \frac{z}{2} = \frac{c\gamma}{4\pi}$$

(step 105).

In the example shown in FIG. 1, a computer performs an FFT algorithm to compute a discrete Fourier transform (DFT) of the cross-correlation signal. The accuracy to which the DFT localizes frequencies depends on sampling frequency and the number of samples. Advantageously, a DFT may identify many simultaneous tones (e.g., dual frequencies) within the cross-correlation signal. However, a DFT may—if the number of frequencies is fixed—be less accurate than frequency estimators that assume a fixed number of frequencies.

This invention is not limited to a Fourier transform, and may instead be implemented with any other method of spectral analysis, such as the Matrix Pencil (MP) algorithm or the Quinn-Fernandes (QF) algorithm. The QF estimator uses a regression model to fit a single frequency to a smoothed parametric representation of the data. For a single tone, the QF algorithm is robust to noise and poor initial estimates. In comparison, the MP technique may be used to separate multiple returns. However, MP may require the number of frequencies to be known a priori.

Each of the following is a non-limiting example of a spectral analysis algorithm that may be employed in this invention: parametric; non-parametric; periodogram; correlogram; Blackman-Tukey; discrete Fourier transform; FFT (fast Fourier transform), Matrix Pencil; Quinn-Fernandes; ARMA (autoregressive moving average), Yule-Walker, least squares, Levinson-Durbin, Delsarte-Genin, modified Yule-Walker, two-stage least squares, Burg (AR estimation), Gohberg-Semencul, nonlinear least squares, high-order Yule-Walker, Pisarenko; MUSIC (multiple signal classification); min-norm; ESPRIT (estimation of signal parameters by rotational invariance techniques); forward-backward; filter bank; Slepian baseband filter; Capon; and spatial algorithms. For example, any of the foregoing examples of spectral analysis may be performed by a computer to identify, for each camera pixel, respectively: (a) a dual frequency of a cross-correlation signal measured by the pixel, which dual frequency is due to single-bounce light striking the pixel; or (b) to identify a set of multiple dual frequencies of a cross-correlation signal measured by the pixel, which set includes a dual frequency that is due to single-bounce light striking the pixel and includes one or more other dual frequencies that are due to multi-bounce light striking the pixel.

Figure 2:
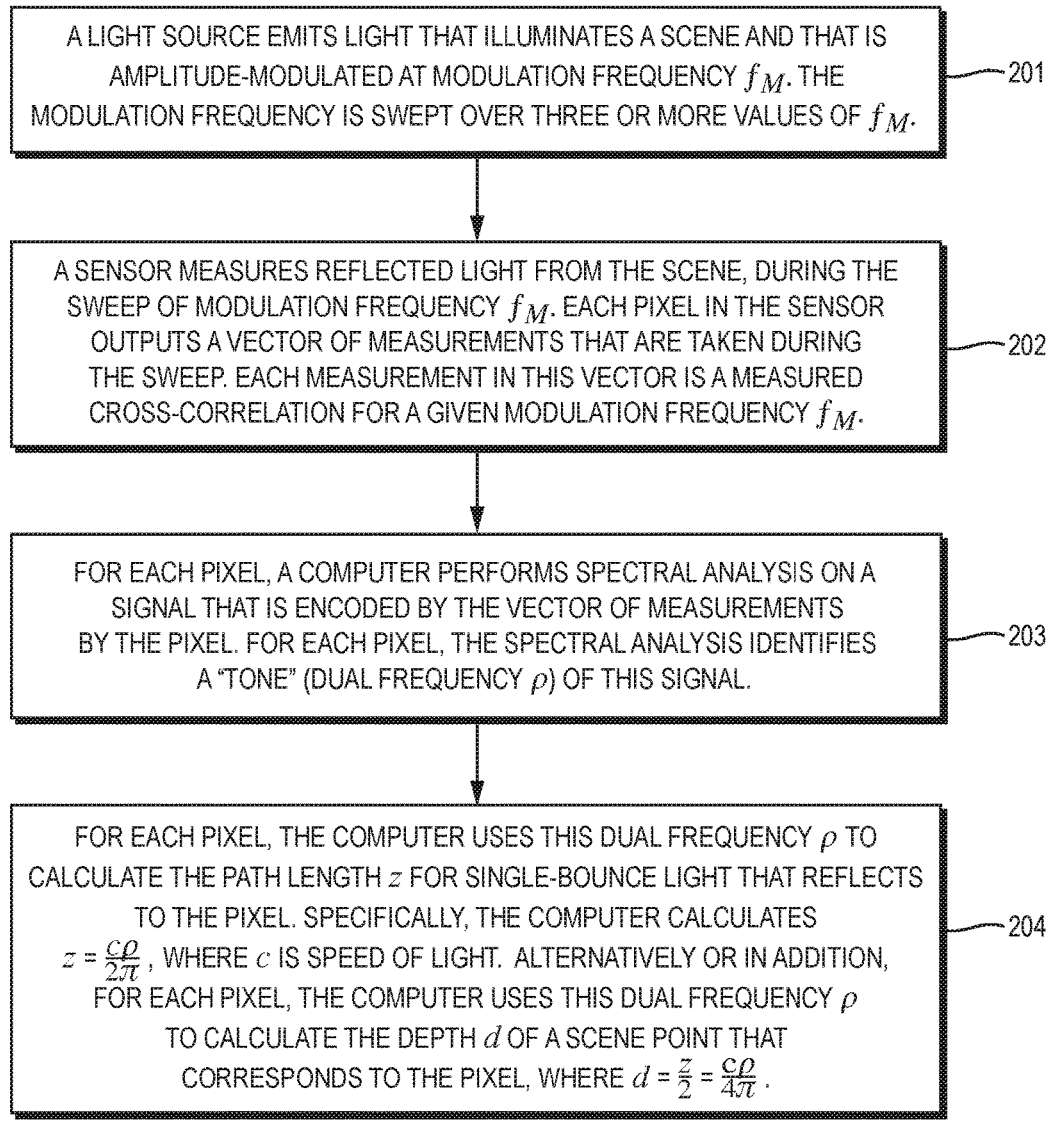
FIG. 2 is a flowchart for another example of ToF sensing.
Figure 3:
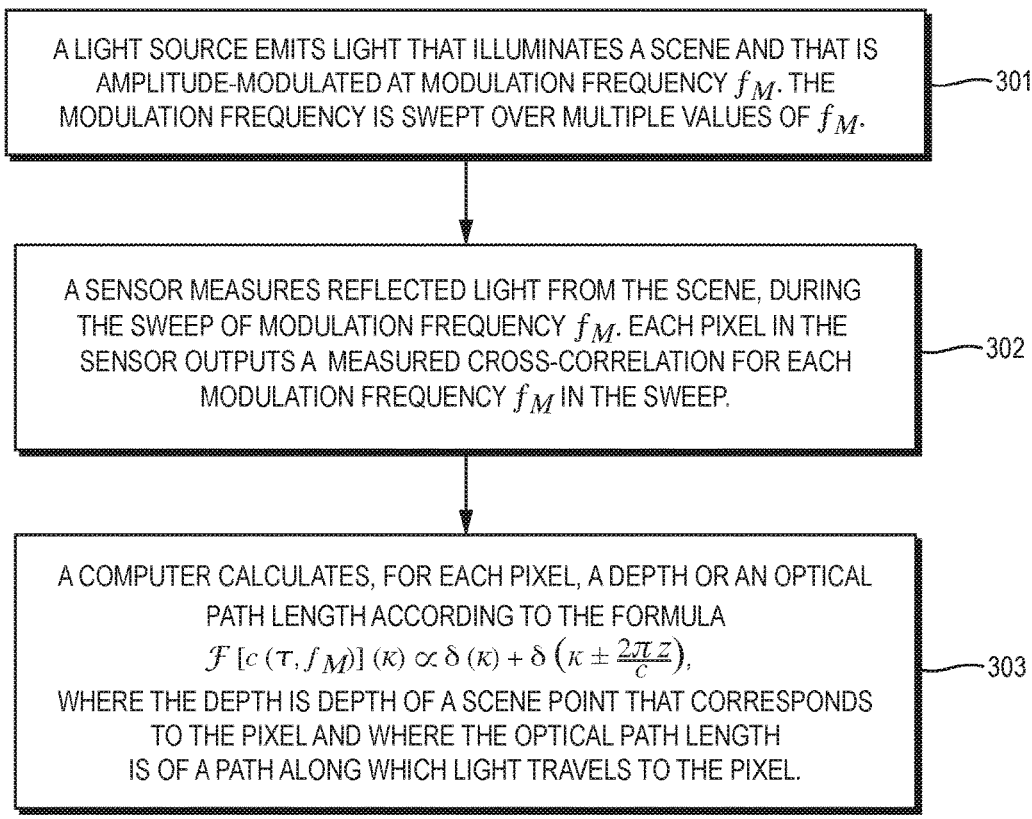
FIG. 3 is a flowchart for yet another example of ToF sensing.

FIGS. 2 and 3 are flowcharts for other examples of ToF sensing, in illustrative implementations of this invention.

In the example shown in FIG. 2, the method includes the following steps: A light source emits light that illuminates a scene and that is amplitude-modulated at modulation frequency $f_M$. The modulation frequency is swept over three or more values of $f_M$ (Step 201). A sensor measures reflected light from the scene, during the sweep of modulation frequency $f_M$. Each pixel in the sensor outputs a vector of measurements that are taken during the sweep. Each measurement in this vector is a measured cross-correlation for a given modulation frequency $f_M$ (Step 202). For each pixel, a computer performs spectral analysis on a signal that is encoded by the vector of measurements for the pixel. For each pixel, the spectral analysis identifies a "tone" (dual frequency ρ) of this signal (Step 203). For each pixel, the computer uses this dual frequency ρ, to calculate the path length Z for single-bounce light that reflects to the pixel. Specifically, the computer calculates $$z = \frac{c\rho}{2\pi},$$

where C is speed of light. Alternatively or in addition, for each pixel, the computer uses this dual frequency ρ to calculate the depth d of a scene point that corresponds to the pixel, where $$d = \frac{z}{2} = \frac{c\rho}{4\pi}$$

(Step 204).

In some cases, the spectral analysis in step 203 identifies a single dual frequency. However, in some use scenarios, multi-path interference (MPI) occurs at a pixel and thus the spectral analysis identifies multiple dual frequencies in the cross-correlation signal for the pixel. In this MPI use scenario, each of the dual frequencies may be due to light that travels a different optical path length. In some use scenarios in which MPI is occurring at a pixel: (a) in step 203, the spectral analysis may identify a set of multiple dual frequencies of a cross-correlation signal measured by the pixel, which set includes a dual frequency that is due to single-bounce light striking the pixel and includes one or more other dual frequencies that are due to multi-bounce light striking the pixel; and (b) in step 204, the computer may compute path length and depth, for each respective dual frequency in the set of dual frequencies, by substituting the respective dual frequency for ρ in step 204.

In illustrative implementations of this invention, optical path length (and thus depth) for a camera pixel may be extracted from dual frequency of a cross-correlation signal outputted by the pixel. The method shown in FIG. 3 is an example of this. In FIG. 3, the method includes the following steps: A light source emits light that illuminates a scene and that is amplitude-modulated at modulation frequency $f_M$. The modulation frequency is swept over multiple values of $f_M$ (Step 301). A sensor measures reflected light from the scene, during the sweep of modulation frequency $f_M$. Each pixel in the sensor outputs a measured cross-correlation for each modulation frequency $f_M$ in the sweep (Step 302). A computer calculates, for each pixel, a depth or an optical path length according to the formula $$\mathcal{F}[c(\tau, f_M)](\kappa) \propto \delta(\kappa) + \delta\left(\kappa \pm \frac{2\pi z}{c}\right),$$

where the depth is depth of a scene point that corresponds to the pixel and where the optical path length is of a path along which light travels to the pixel (Step 303). The formula in Step 303 is identical to Equation 1 above. In cases where depth of a scene point is being calculated, z is replaced with z/2 in the formula shown in Step 303 and in Equation 1.

In some implementations (including in some versions of the methods described in FIGS. 1, 2 and 3), each element of the vector of measurements for a pixel may itself comprise an average of multiple cross-correlation measurements taken by the pixel. For example, the multiple measurements that are averaged for a given modulation frequency may be acquired by the pixel during multiple subframes, frames or exposures.

In some implementations (including in some versions of the methods described in FIGS. 1, 2 and 3): (a) the path length for a given path may be computed multiple times, and an average path length for the given path may be computed; or (b) the depth of a scene point may be computed multiple times, and an average depth for the scene point may be computed.

Figure 4:
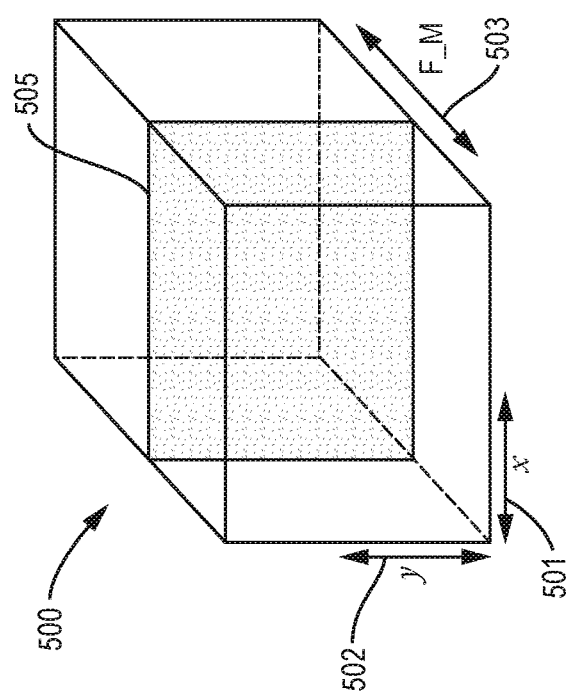
FIG. 4 shows a data cuboid.

FIG. 4 is a conceptual diagram of a data cuboid, in an illustrative implementation of this invention. In the example shown in FIG. 4, at a single pixel, each cross-correlation measurement at a given modulation frequency is a scalar value. For the full pixel array of the camera, the cross-correlation measurements at a given modulation frequency may be represented by a 2D matrix (a 'subframe'). For the full pixel array of the camera, cross-correlation measurements over a sweep of modulation frequencies may be represented by a 3D matrix (a data cuboid). In this 3D matrix (data cuboid), the third dimension is modulation frequency of the amplitude-modulated light. Thus, for a given pixel, different points along this third axis correspond to cross-correlation measurements taken at different modulation frequencies during a sweep of the modulation frequency of amplitude-modulated light.

In the example shown in FIG. 4, the first and second dimensions of the data cuboid 500 corresponds to the x and y spatial coordinate of camera pixels, in the camera sensor plane. Thus, axis 501 is the x axis and axis 502 is the y axis, in the camera sensor plane. The third axis 503 of the data cuboid 500 corresponds to modulation frequency of amplitude-modulated light. In the data cuboid shown in FIG. 4, points in a vector that is parallel to the third axis 503 are indexed at different temporal frequencies, because they encode measurements taken at different modulation frequencies (where each modulation frequency is a frequency both of the reference signal and of amplitude-modulation by the light source). Subframe 505 is a set of cross-correlation measurements taken by all of the camera pixels at a given modulation frequency of the amplitude-modulated light.

In a prototype of this invention: (a) the camera acquires an image at each modulation frequency, with invariant exposure times; and (b) the result is a data cuboid of size 120×160×F, where F is the number of modulation frequencies captured. In this prototype, there is a phase-offset induced by electronic delays in the datapaths through the camera, which would (in the absence of calibration) result in erroneous depth estimates. However, in this prototype, this phase-offset is constant for all pixels, and at all modulation frequencies, and is calibrated away using a scene-point of known depth. In this prototype: (a) an exposure for a subframe (i.e., at a given modulation frequency) is on the order of milliseconds; and (b) the modulation frequency is on the order of a MHz. Therefore, in this prototype, the number of periods of modulation of the amplitude-modulated light that are integrated in a single exposure (for a single subframe) is on the order of 1,000. This prototype is a non-limiting example of this invention.

Figure 5:
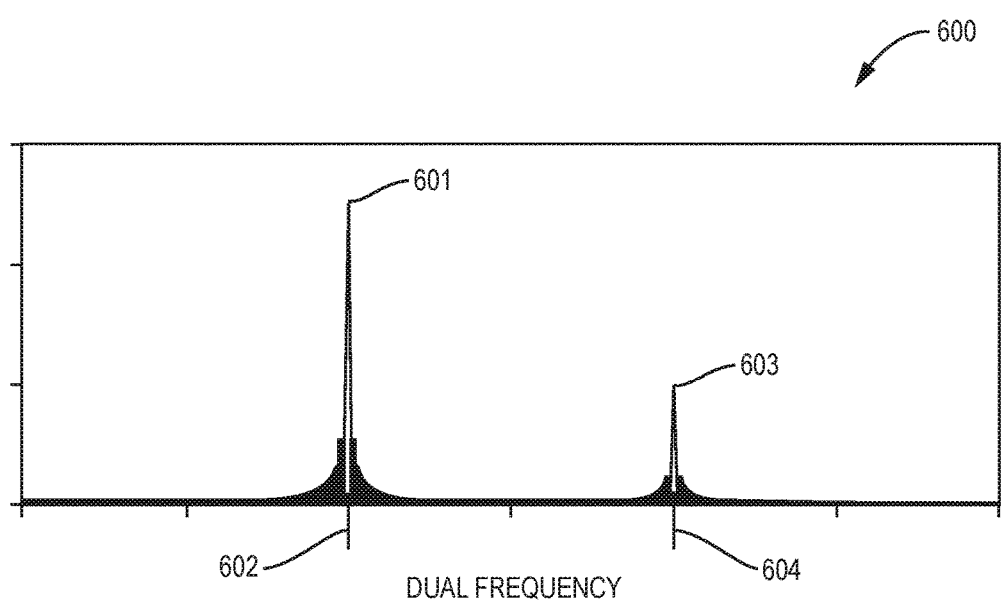
FIG. 5 shows an example of dis-entanglement of multi-path interference.

FIG. 5 shows an example of dis-entanglement of multi-path interference. In the example shown in FIG. 5, a computer calculates a power spectrum 600 of a cross-correlation signal for a pixel that is undergoing multi-path interference. For example, the computer may perform an FFT to calculate the power spectrum 600. In FIG. 5, a first peak 601 of the power spectrum 600 occurs at a first dual frequency 602; and a second peak 603 of the power spectrum 600 occurs at a second dual frequency 604, where the second dual frequency is greater than the first dual frequency. The first peak 601 is due to light that travels along a first path (to the pixel) that has an optical path length of 10 meters. The second peak 603 is due to light that travels along a second path (to the pixel) that has an optical path length of 20 meters. For example, the first peak 601 may be due to single-bounce light that traveled along a path that has a total optical path length of 10 meters and that reflected off a scene point at a depth of 5 meters. For example, the second peak 603 may be due to multi-bounce light that traveled along a path that has a total optical path length of 20 meters and that reflected from multiple scene points before reaching the camera pixel.

As can be seen from FIG. 5, the separate contributions of the two paths appear at two separate dual frequencies in the power spectrum (e.g., in a power spectrum in the Fourier domain). Thus, the frequency-domain time-of-flight sensing dis-entangles multi-path interference. The path length that corresponds to each dual frequency may be separately calculated, as described above.

In FIG. 5, the horizontal axis is dual frequency, which may be expressed as units of time (e.g., seconds). In the example shown in FIG. 5, the greater the dual frequency (in the power spectrum, e.g., in the Fourier domain), the greater the corresponding optical path length. For example, in FIG. 5, dual frequency 604 which corresponds to an optical path length of 20 meters is greater than dual frequency 602 which corresponds to an optical path length of 10 meters.

In many implementations of this invention: (a) the highest peak in the power spectrum corresponds to a "DC component" of the cross-correlation signal (i.e., the component with dual frequency of zero); and (b) the second highest peak in the power spectrum is due to single-bounce light. In FIG. 5, the highest peak (corresponding to the "DC" component) is not shown.

Hardware

Figure 6:
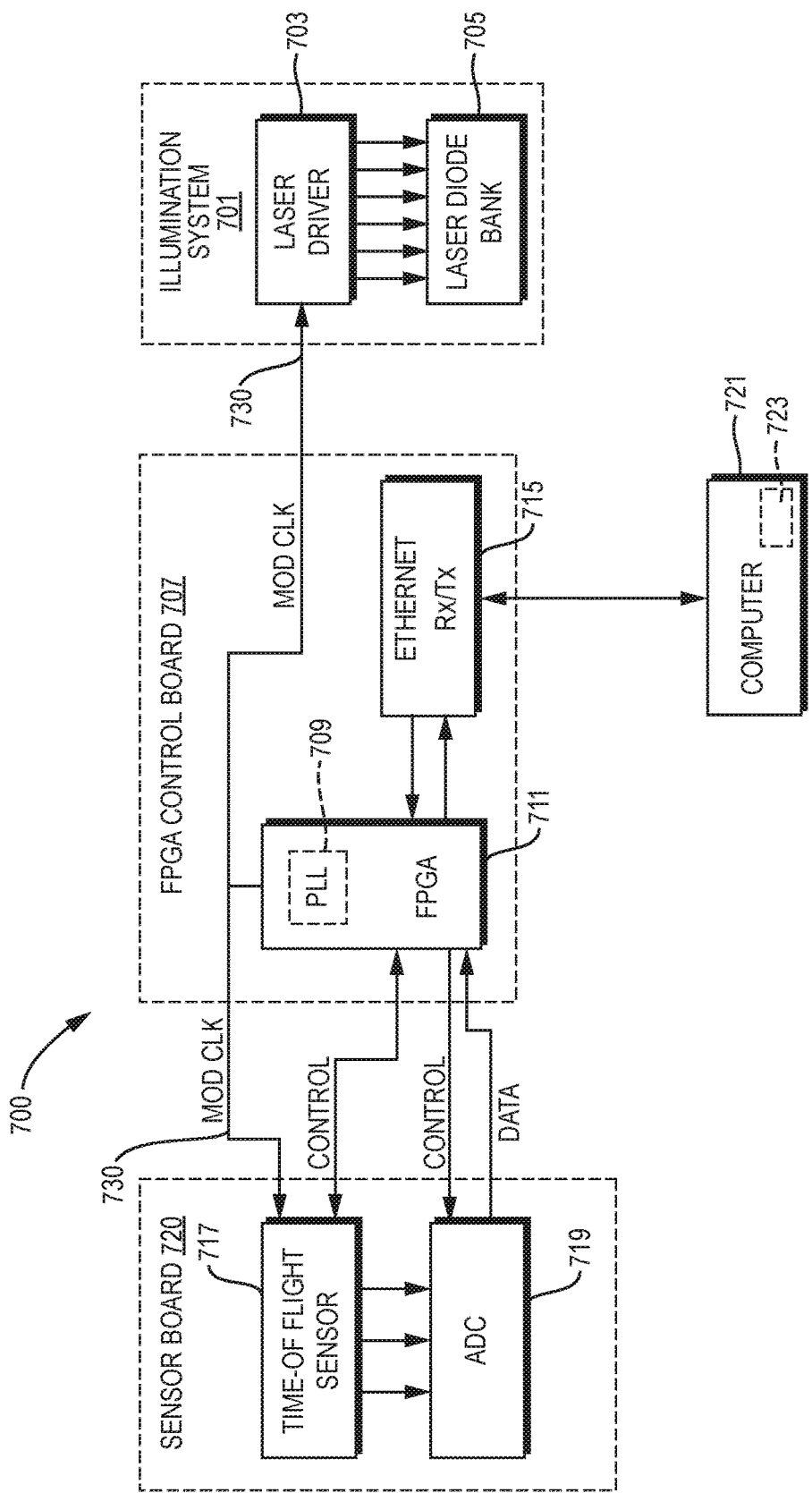
FIG. 6 shows an example of hardware for a ToF camera.

FIG. 6 shows an example of hardware, in an illustrative implementation of this invention. In FIG. 6, an ToF camera 700 comprises an illumination system 701, a FPGA (field-programmable gate array) control board 707, a ToF sensor board 720, and a computer 721.

In FIG. 6, the illumination system 701 comprises a laser driver 703 and a laser diode bank 705. The laser driver 703 controls the laser diode bank 705, such that (a) the laser diode bank emits amplitude-modulated light that illuminates a scene, and (2) the modulation frequency of the amplitude-modulated light is swept through three or more modulation frequencies.

In FIG. 6, the sensor board 720 comprises a time-of-flight sensor 717 and an ADC (analog-to-digital converter) 719. The time-of-flight sensor 717 takes measurements of light incident on pixels of the sensor 717 and produces analog output signals. The ADC 719 converts these analog signals to digital signals.

In FIG. 6, the FPGA control board 707 comprises a FPGA 711 and Ethernet Tx/Rx (transmit/receive) connectors 715. The FPGA includes PLL (phased locked loop) 709 The FPGA 711 controls, and receives data from, the sensor 717 and the ADC 719. The PLL 709 outputs a mod clk (modulation clock) electrical signal 730 that simultaneously controls the laser driver 703 and the sensor 717. For example, for a given modulation frequency, the mod clk signal 730 may cause the phase of the reference signal that is applied to the sensor 717 to be the same as the phase of the amplitude modulation of light by the illumination system 701. Alternatively, the mod clk signal 730 may cause a phase difference to be constant for a given modulation frequency, where the phase difference is the difference between (i) the phase of the reference signal applied to pixels of the sensor 717 and (ii) the phase of the amplitude modulation of light by the illumination system 701. For example, in some cases, the phase difference may be non-zero because latency in a data pathway for the reference signal may be different than latency in a data pathway for the amplitude modulation of the light. The modulation frequency will change in discrete steps during a sweep (and if there is non-zero phase difference, it too may change in discrete steps at the same times that the modulation frequency changes). However, for each given modulation frequency: (a) the phase of the reference signal and the phase of amplitude modulation by the light source may be identical; or (b) any phase difference (between the reference signal and the amplitude modulation by the light source) may be constant.

In FIG. 6, the FGPA 711 controls the PLL 709 such that temporal frequency of the modulation clock signal 730 emitted by the PLL 709 sweeps over multiple temporal frequencies, which in turn causes the modulation frequency (of the amplitude-modulated light emitted by the illumination system 701) to sweep over multiple modulation frequencies. The Ethernet Tx/Rx connectors 715 transmit and receive data from computer 721.

In FIG. 6, the computer 721 includes a memory device 723 for storing data. The computer 721 may be part of the ToF camera 700 or may be remote from the ToF camera 700.

The following seven paragraphs describe hardware in a prototype of this invention.

In this prototype, the laser driver 703 comprises an iC-HG laser switch (available from iC-Haus), and the laser diode bank 705 comprises six diffused, 650 nm Mitsubishi® LPC-826 laser-diodes.

In this prototype, the illumination system emits diffuse, visible light. In this prototype, the diffuse, visible light is used for eye-safety reasons, so that operators know when the camera is on.

In this prototype, the FPGA control board 707 comprises a Terasic™ DE2-115 board, and the FPGA 711 comprises an Altera® Cyclone® IV FPGA. In this prototype, the FPGA control board 707 controls sensor configuration, pixel array readout, ADC polling, and modulation of the illumination and modulation of sensor exposure.

In this prototype, reconfigurable phased-locked loop (PLL) 709 output a modulation clock (mod clk) signal 730 that synchronously modulates the ToF sensor 717 and the illumination system 701. In this prototype, during each sweep of modulation frequency, the PLL 709 dynamically alters the modulation frequency of the amplitude-modulated light emitted by the illumination system 730.

In this prototype, the ToF sensor 717 comprises a 120× 160 pixel PMD PhotonICs® 19k-S3 chip (available from PMD Technologies), and the ADC 719 comprises an Analog Devices® AD9826 signal processor. Each pixel in the 19k-S3 chip is a CMOS (complementary metal-oxide-semiconductor) sensor. In this prototype, rapid read-out of the 120×160 sensor array is achieved with simultaneous output of analog voltage from 3 pixels. This analog signal is converted to digital format by a high-speed analog-to-digital converter (ADC).

For this prototype, calibration was performed at each modulation frequency to remove non-linear effects.

In some use scenarios of this prototype: (a) each sweep of modulation frequency (of the amplitude-modulated light emitted by the lase diodes) comprises either 4 or 45 modulation frequencies; (b) thus, the sensor captures either 4 or 45 modulation frequency-indexed subframes per sweep; and (c) the modulation frequency bandwidth (difference between highest and lowest modulation frequencies in each sweep) is in a range between 5 MHZ and 50 MHz.

The prototype described in the preceding seven paragraphs is a non-limiting example of this invention. This invention may be implemented in many other ways.

In an experiment, the accuracy of this prototype was tested over a range of noise levels (i.e., SNR levels), in a multi-path interference scenario. In this experiment, camera noise included read noise, dark noise and shot noise. In this experiment, at low SNR levels (e.g., less than 20 dB of SNR), this prototype estimated scene depth more accurately than two conventional phase-ToF cameras (that is, this prototype had a mean absolute error in its estimate of scene depth that was lower than that of each of the two phase-ToF cameras).

In some implementations, the amplitude-modulated light emitted by the illumination system 701 comprises pulsed (e.g., strobed) light. For example, the modulation signal may comprise a pulse wave, such as a square wave or rectangle wave. The duty cycle of the pulse wave may be 50%, or may be greater than or less than 50%. Alternatively, in some implementations, the amplitude-modulated light emitted by the illumination system 701 may comprise continuous-wave illumination. For example, in some implementations, one or lasers in the illumination system may operate in pulsed mode, or may operate in continuous-wave mode.

This invention is not limited to visible light. For example, in some implementations of this invention, the illumination system 701 emits radio-frequency waves, microwaves, infrared light, visible light, ultraviolet light, or x-rays. For example, in some cases: (a) the illumination system 701 emits x-rays; (b) the sensor board 720 includes a scintillator that converts incident x-ray radiation to lower frequency (e.g., visible light) radiation; and (c) the sensor 717 measures the lower frequency radiation.

This invention is not limited to diffuse, incoherent light. For example, in some implementations of this invention, the illumination system emits coherent light or emits collimated light.

This invention is not limited to laser diodes and laser drivers. For example, in some implementations of this invention, the illumination system includes one or more active light sources that comprise any combination of one or more of the following: LED (light-emitting diode), OLED (organic light-emitting diode), PLED (polymer light-emitting diode), SSL (solid-state light) source, laser (such as solid-state laser, laser diode, titanium-doped sapphire laser, fiber laser, photonic crystal laser, semiconductor laser, free-electron laser, gas laser, hydrogen fluoride laser, deuterium fluoride laser, other chemical laser, excimer laser, or laser that employs transitions among isomeric states of an atomic nucleus), x-ray tube (e.g., including a hot cathode that emits electrons that are accelerated and strike an anode target that emits x-ray photons), other x-ray source (e.g., x-ray emitting film of carbon nanotubes), or incandescent or fluorescent light source (including, in some cases, one or more LCDs, DMDs or electronic shutters to rapidly modulate amplitude of light emitted by the incandescent or fluorescent light source). In some cases, a light source includes a diffuser, such that light passes through or reflects from the diffuser before exiting the light source, and thus is incoherent when emitted by the light source. In some cases, a light source includes a lens, mirror or collimator, such that light emitted by the light source is collimated by the lens, mirror or collimator.

Cross-Correlation

In illustrative implementations, a cross-correlation is computed for each camera pixel, for each modulation frequency in a sweep of modulation frequencies of amplitude-modulated light. The cross-correlation for a pixel may be performed by analog computation by the pixel itself, or by digital post-processing calculations by a computer. The cross-correlation for a pixel may be a cross-correlation of (a) a light signal incident on the pixel and (b) a reference signal that modulates operation of the pixel. The camera may thus acquire—for each camera pixel for each sweep of modulation frequencies—a vector of cross-correlation measurements. A computer may, for each camera pixel: (a) take the vector of cross-correlation measurements as an input; (b) identify one or more dual frequencies of the discrete-valued signal that is encoded by this vector; and (c) based on these one or more dual frequencies, (i) compute one or more optical path lengths of light incident on the pixel, such as the path length of single-bounce light incident on the pixel, or (ii) compute the depth of a scene point corresponding to the pixel.

Figure 7C:
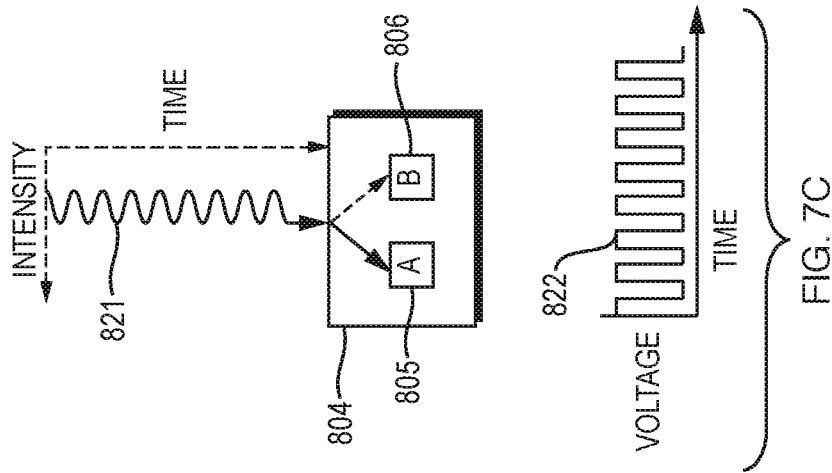
FIGS. 7A, 7B, and 7C show an example of cross-correlation by a pixel, during a sweep of modulation frequencies.
Figure 7B:
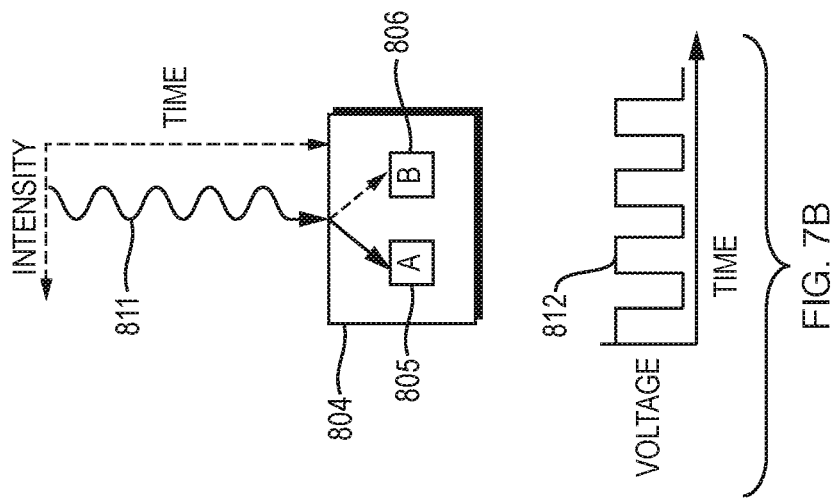
Figure 7A:
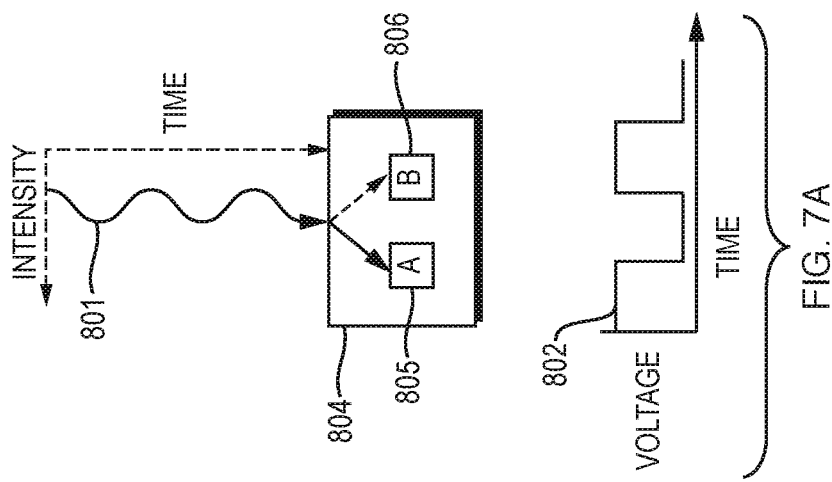

FIGS. 7A, 7B, and 7C are diagrams that show an example of cross-correlation by a pixel, during a sweep of modulation frequencies, in an illustrative implementation of this invention. FIGS. 7A, 7B, and 7C show the first, second and third modulation frequencies, respectively, in the sweep.

In FIGS. 7A-7C, amplitude-modulated light 801, 811, 821 strikes camera pixel 804. Before striking pixel 804, this light 801, 811, 821 was emitted by active light sources in the camera and then reflected from the scene (directly or indirectly). A reference signal 802, 812, 822 controls the pixel's response to the incident light 801, 811, 821. Depending on the state of the reference signal 802, 812, 822 (e.g., a Boolean state of high or low) at a given time; electrical charge carriers (e.g., holes or free electrons) being optically generated in pixel 804 (in response to the incident light) may be transferred either to region 805 or to region 806. For example, in some cases: (a) for periods when the reference signal 802, 812, 822 is high, charge accumulating due to photoelectric effect may be transferred to region 805; and (b) for periods when the reference signal 802, 812, 822 is low, charge accumulating due to photoelectric effect may be transferred to region 806.

In the example shown in FIGS. 7A-7C: (a) charge may be read-out only from region 805; or (b) charge may be read-out only from region 806; or (c) the difference in charge (i.e., the difference between charge accumulated in region 805 and charge accumulated 806) may be read-out. For example, if charge for pixel 804 is read-out from only region 805, then the charge in region 805 may be read-out but the charge in region 806 may be dumped (or drained or otherwise discharged) without being read-out. Likewise, if charge for pixel 804 is read-out from only region 806, then the charge in region 806 may be read-out but the charge in region 805 may be dumped (or drained or otherwise discharged) without being read-out.

As noted above, in FIGS. 7A-7C, for each modulation frequency, a reference signal is applied to pixel 804 while pixel 804 is being struck by incident light. In FIGS. 7A-7C, the reference signal controls the pixel's response to incident light—and thus causes the pixel to perform, for each modulation frequency, an analog computation that effectively computes a cross-correlation of the incident light signal and the reference signal. For example, in FIG. 7A: (a) the incident light is at a first modulation frequency; and (b) pixel 804 performs an analog computation that effectively computes, for the first modulation frequency, a cross-correlation of the incident light signal 801 and the reference signal 802. Likewise, in FIG. 7B: (a) the incident light is at a second modulation frequency; and (b) pixel 804 performs an analog computation that effectively computes, for the second modulation frequency, a cross-correlation of the incident light signal 811 and the reference signal 812. Likewise, in FIG. 7C: (a) the incident light is at a third modulation frequency; and (b) pixel 804 performs an analog computation that effectively computes, for the third modulation frequency, a cross-correlation of the incident light signal 811 and the reference signal 812.

In FIGS. 7A-7C, regions 805 and 806 are labeled "A" and "B", respectively. Regions 805 and 806 may each comprise a region (e.g., floating region, floating diffusion, capacitive storage device, or other solid-state storage region) in which charge is stored or to which charge is transferred.

In the example shown in FIGS. 7A-7C, during all exposure times for a given modulation frequency, the reference signal 802, 812, 822 has the same phase as the phase of the amplitude modulation of light at the active light source. Alternatively, in FIGS. 7A-7C, during all exposure times for a given modulation frequency, a non-zero phase difference is constant, where the phase difference is the difference between the phase of the reference signal that is applied to pixel 804 and the phase of the amplitude modulation of light at the active light source. Modulation frequency may change in discrete steps during the sweep, and any non-zero phase difference (between the reference signal and amplitude modulation by the light source) may change at the same time that the modulation frequency changes. (Also, for clarity of understanding, recall that the phase of incident light at the pixel may vary depending on scene depth).

For ease of illustration, FIGS. 7A-7C show only three modulation frequencies in the sweep. However, in many use scenarios, the number of modulation frequencies in a sweep is more than three.

Figure 8:
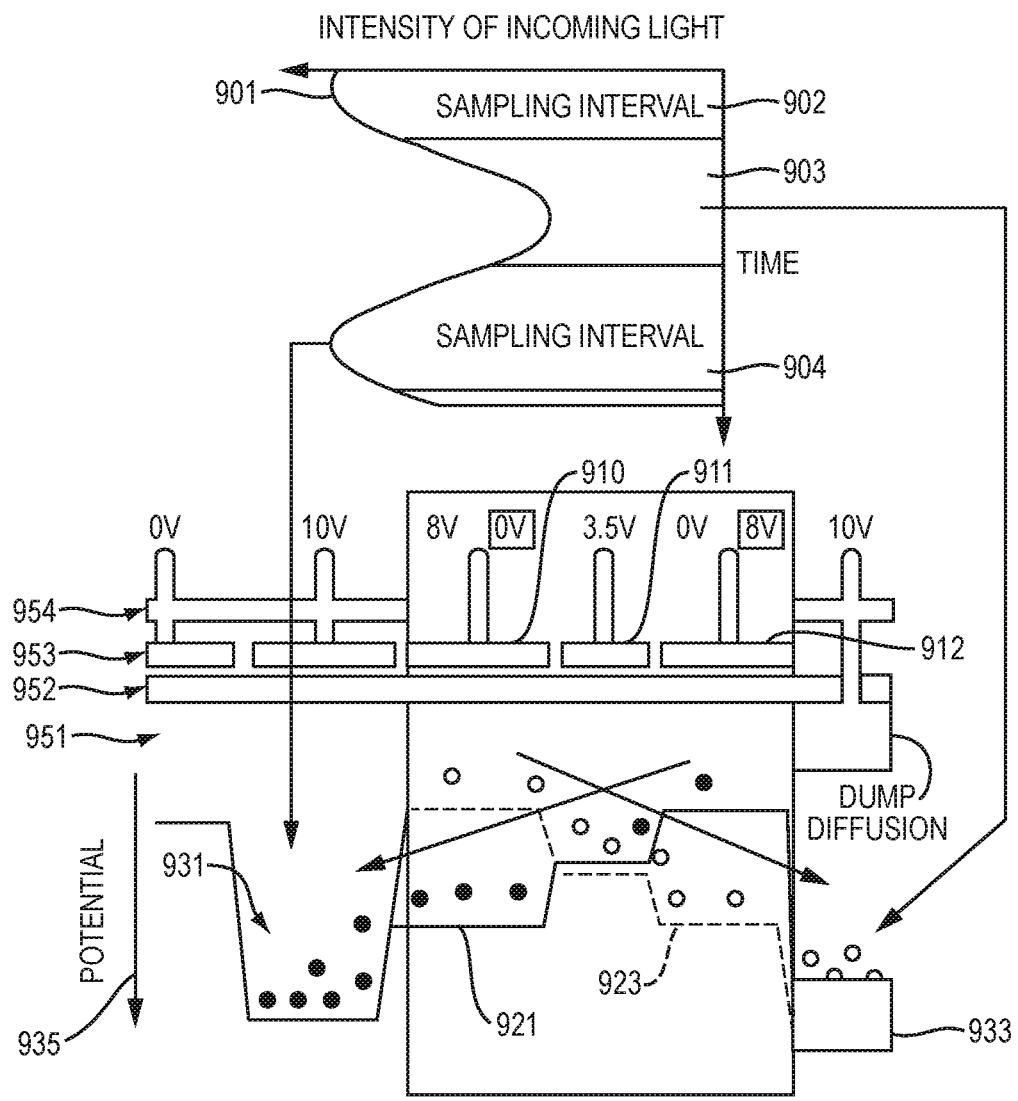
FIGS. 8 and 9 show another example of cross-correlation by a pixel.
Figure 9:
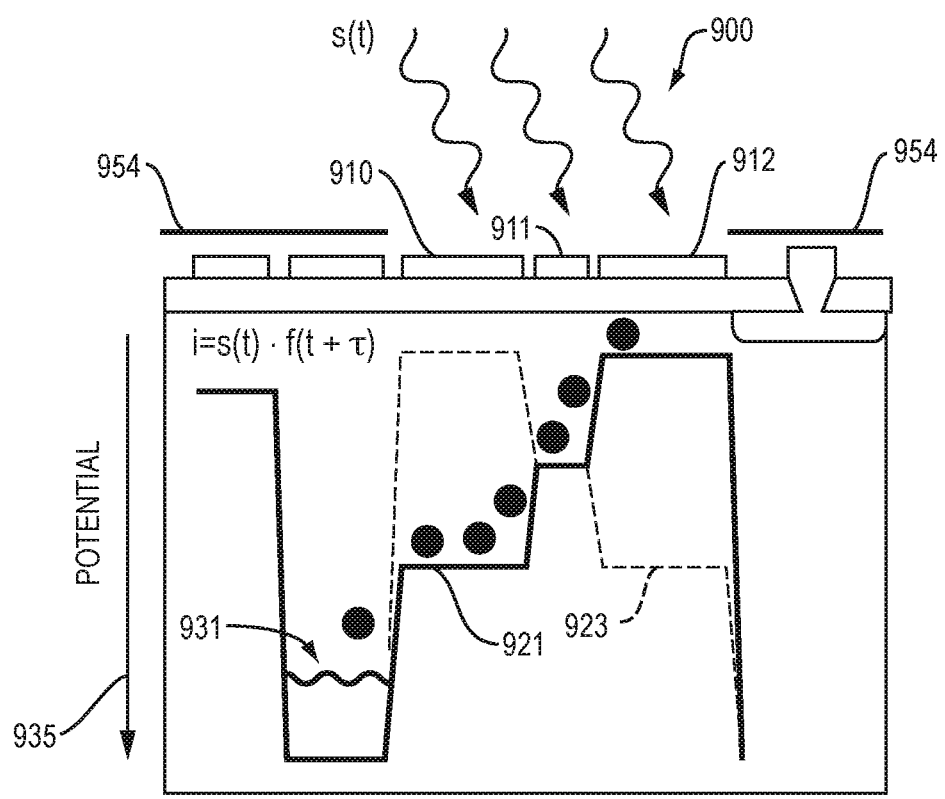

In illustrative implementations of this invention, analog or digital computation of cross-correlation may be performed by existing technology. For example, in some implementations of this invention, each cross-correlation may be measured by a pixel described in Lange, R., "3D Time-of-Flight Distance Measurement with Custom Solid-State Image Sensors in CMOS/CCD-Technology", PhD dissertation, University of Siegen, 2000 (the "Lange Thesis"). FIGS. 8 and 9 are based on FIG. 5.7 of the Lange Thesis and show a "one-tap lock-in pixel" described in the Lange Thesis.

FIGS. 8 and 9 are conceptual diagrams that show another example of cross-correlation by a pixel, in an illustrative implementation of this invention. FIG. 8 provides details about hardware of a pixel and about different voltage gradients produced in the pixel. FIG. 9 shows how the pixel performs an analog computation that effectively calculates a cross-correlation.

In FIGS. 7, 8 and 9, for each given modulation frequency, the electrical reference signal that is applied to the pixel has the same phase as—or has a constant phase difference with—amplitude modulation of light at the active light source.

In FIGS. 8 and 9, a so-called "one-tap lock-in pixel" includes a left photogate 910, a middle photogate 911, a right photogate 912, an opaque layer 954, CCD (charge-coupled device) transfer gates 953, oxide layer 952, and substrate 951. In FIG. 8, light 901 (which has reflected from the scene)

strikes the pixel. Alternatively, the pixel shown in FIGS. 8 and 9 may have more than three photogates in order to have more control over a voltage gradient produced by applying different voltages to different photogates.

In FIGS. 8 and 9, the reference signal has binary Boolean states, high and low. The Boolean state (high or low) of the reference signal controls the voltages at photogates 910, 911, 912, which in turn controls the voltage gradient in the substrate 951. When the reference signal is high, voltages at photogates 910, 911, and 912 are 8V, 3.5V and 0V, respectively, which causes a first voltage gradient 921 to occur in substrate 951. When the reference signal is low, voltages at photogates 910, 911, and 912 are 0V, 3.5V and 8V, respectively, which causes a second voltage gradient 923 to occur in substrate 951.

The lower part of FIG. 8 and the lower part of FIG. 9 each graphically represent voltage gradient in the substrate 951. In this graphical representation, a vertical axis 935 is voltage (electric potential); the further down this vertical axis 935, the greater the voltage. For example, when the first voltage gradient 921 occurs (because the reference signal is high, and thus voltages at photogates 910, 911, 912 are 8V, 3.5V and 0V, respectively) the voltage in the region near photogate 910 is greater than the voltage in the region near photogate 911 which is greater than the voltage in the region near photogate 912. Likewise, when the second voltage gradient 923 occurs (because the reference signal is low, and thus voltages at photogates 910, 911, 912 are 0V, 3.5V and 8V, respectively) the voltage in the region near photogate 910 is less than the voltage in the region near photogate 911 which is less than the voltage in the region near photogate 912.

In FIGS. 8 and 9, optically-generated charge carriers are represented as black dots when voltage gradient 921 occurs and as small white circles when voltage gradient 923 occurs. When voltage gradient 921 occurs (because the reference signal is high), optically-generated charge carriers travel to region 931, where they are stored for later read-out. But when voltage gradient 923 occurs (because the reference signal is low), the charge carriers travel to region 933 and are dumped through dump diffusion without being read-out. This process may be repeated until a sufficiently large charge (for read-out) accumulates in region 931.

In FIGS. 8 and 9, the sampling periods (e.g., 902, 904) occur when the reference signal is high. Optically-generated charge carriers produced during sampling periods are transferred to region 931 and read-out. Likewise, in FIGS. 8 and 9, the non-sampling periods (e.g., 903) occur when the reference signal is low. Optically-generated charge carriers produced during non-sampling periods are transferred to region 933 and are dumped without read-out.

In FIGS. 8 and 9, the pixel performs an analog cross-correlation calculation, by controlling a voltage gradient in a substrate. This analog calculation effectively: (a) multiplicatively mixes the reference signal and the incident light signal; and (b) then integrates the resulting product over time.

FIG. 9 shows, in a conceptual diagram, this analog computation of cross-correlation. In FIG. 9, the incident light signal 900 is s(t) and the reference signal is f(t+τ). The reference signal (and resulting shifts in voltage gradient in the substrate) cause measured incident light intensity to be equal to i=s(t)·f(t+τ). In FIG. 9, the charge accumulating over time (and later read-out) is integrated as $$Q = \int i = \int s(t) \cdot f(t+\tau) dt = s(t) \otimes f(t)$$ (Equation 4)

where ⊗ means cross-correlation.

In Equation 4, Q is a scalar that is a cross-correlation (also known as a sliding inner product or sliding inner product) of incident light signal s(t) and reference signal f(t+τ). Thus, FIG. 9 shows that the pixel is performing an analog cross-correlation measurement. (Note that the intensity of incident light s(t) is a real-valued function. Thus s(t) and its complex conjugate $\bar{s}(t)$ are equal to each other, and thus there is no need to substitute $\bar{s}(t)$ for s(t) in the integrand in Equation 4).

Figure 10:
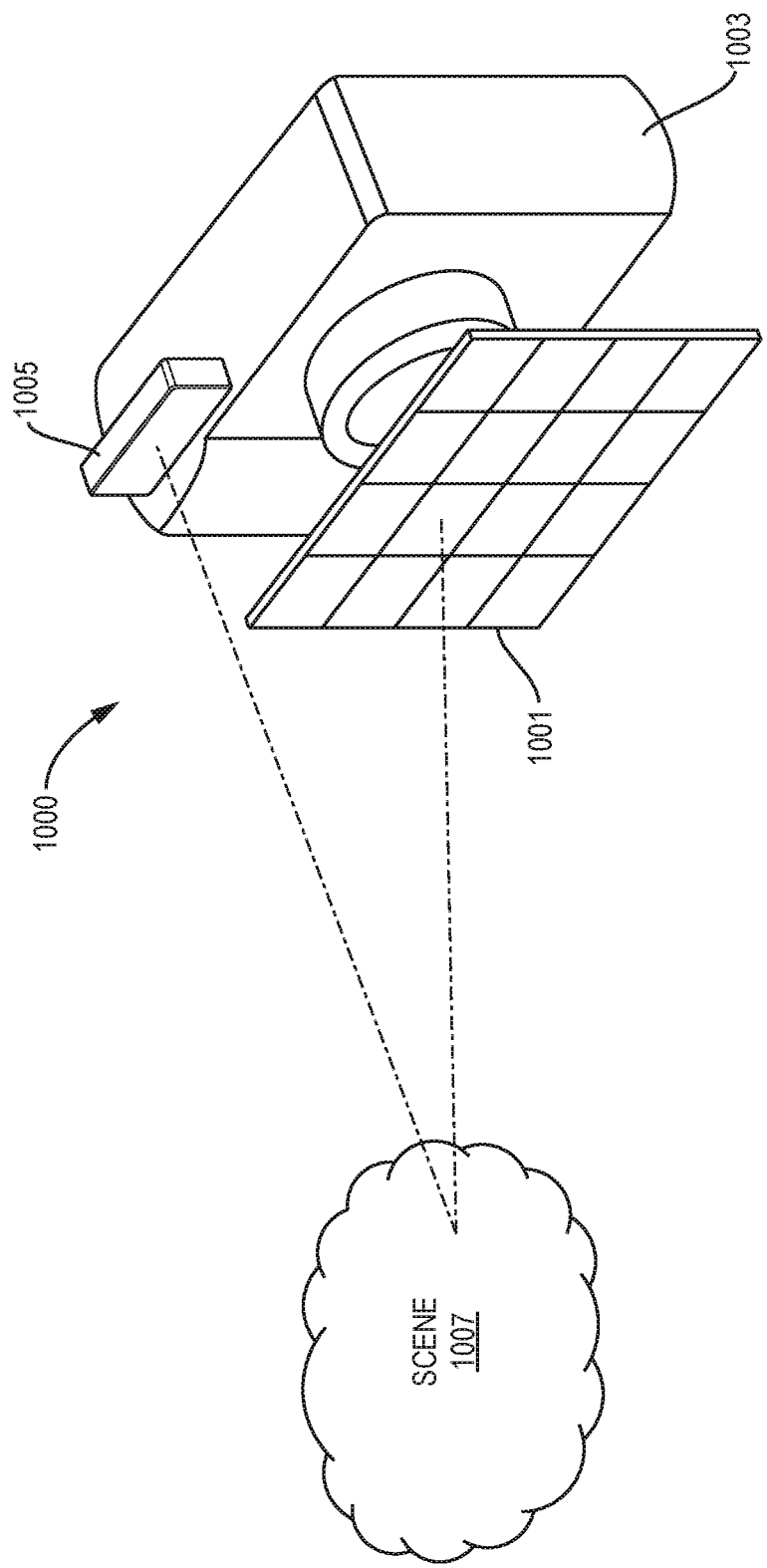
FIG. 10 shows an example in which selective attenuation of light is used to perform an analog cross-correlation computation.

FIG. 10 shows an example in which selective attenuation of light is used to perform analog cross-correlation, in an illustrative implementation of this invention. In the example shown in FIG. 10, a ToF imaging system 1000 includes a dynamically controllable LCD (liquid crystal display) 1001, a camera 1003, and a light source 1005.

In FIG. 10, the light source 1005 emits amplitude-modulated light.

In FIG. 10, the LCD 1001 is positioned in front of the camera 1003; that is, between camera 1003 and the scene 1007 being imaged. In FIG. 10, any single-bounce light reflecting from scene 1007 that reaches a pixel of camera 1003 must first pass through a corresponding pixel of the LCD 1001. Each pixel of the LCD 1001 has a binary Boolean state: the LCD pixel either transmits light or does not transmit light. The state of each LCD pixel is controlled by a reference signal that is synchronized with the amplitude modulation of light by the light source 1005.

In FIG. 10, the camera 1003 measures selectively attenuated light that passes the LCD 1001.

In FIG. 10, the LCD 1001 selectively attenuates light that reflects from the scene and that strikes the LCD 1001. This selective attenuation of light by LCD 1001 is controlled by the reference signal. By selectively attenuating the light, LCD 1001 multiplicatively mixes the reference signal and the light incident on the LCD. The intensity of the light that exits LCD 1001 (after being transmitted through the LCD) depends on the product of this multiplicative mixing. Each pixel in the camera integrates multiplicatively mixed light that has passed through a corresponding pixel in the LCD.

In FIG. 10, this multiplicative mixing and integration, taken together, perform an analog cross-correlation computation.

In illustrative implementations, the camera performs (for each sensor pixel in the camera, for each modulation frequency in a sweep of modulation frequencies) an cross-correlation measurement—that is, an analog or digital calculation of cross-correlation of a first signal and a second signal, where (a) the first signal is light incident on the camera pixel (or on an SLM pixel that corresponds to the camera pixel); and (b) the second signal is an electrical reference signal that is applied to the camera pixel.

In illustrative implementations of this invention, cross-correlation measurement may be achieved in many ways, and is not limited to the examples shown in FIGS. 7A, 7B, 7C, 8, 9 and 10.

In some implementations: (a) the camera pixels may comprise an array of PMD (photonic mixer device) pixels; and (b) the PMD pixels may take analog cross-correlation measurements, such that each respective pixel takes at least one analog cross-correlation measurement for each modulation frequency of the amplitude-modulated light. Likewise, in some implementations: (a) the camera pixels may comprise an array of lock-in pixels; and (b) the lock-in pixels may take analog cross-correlation measurements, such that each respective pixel takes at least one analog cross-correlation measurement for each modulation frequency of the amplitude-modulated light. In some implementations, the camera pixels may comprise CMOS pixels. In some implementations, the camera pixels may comprise CCD pixels.

In some implementations, each camera pixel takes at least one analog cross-correlation measurement for each modulation frequency. In these implementations, the analog computation (or analog measurement) of cross-correlation of the light signal and reference signal may include any one or more of the following steps A-F: (A) the reference signal modulating the gain (or sensitivity to light) of the camera pixel, while the light signal is incident on the camera pixel; (B) the reference signal dynamically controlling the direction of movement of electric charge carriers in a semiconductor of the camera pixel, which carriers are optically generated while the light signal is incident on the pixel; (C) the reference signal dynamically controlling voltages at one or more positions in a solid-state device, and thereby dynamically controlling a voltage gradient in a region of the solid-state device; (D) the reference signal controlling the transfer, storage, read-out (or drain, discharge or reset without read-out) of electric charge carriers that are optically generated while the light signal is incident on the camera pixel; (E) the reference signal controlling where (e.g., to which storage device) optically generated charge carriers are transferred at a given time during or after an exposure; (F) the reference signal dynamically controlling the reflection of light from an SLM pixel that corresponds to the camera pixel; or (G) the reference signal dynamically controlling the transmission of light through an SLM pixel that corresponds to the camera pixel. Steps A to G in the preceding sentence are sometimes referred to herein collectively as "Analog Steps A-G" and individually as Analog Step A, Analog Step B, Analog Step C, Analog Step D, Analog Step E, Analog Step F, and Analog Step G, respectively.

Alternatively, in some implementations of this invention, cross-correlation is computed digitally. A camera may perform (for each pixel in the camera, for each modulation frequency in a sweep of modulation frequencies) a digital cross-correlation measurement. For example, in some cases: (a) analog measurements of light intensity taken by a pixel may be read-out (e.g., via a CCD array); (b) the analog measurements may be converted to digital data; and (c) one or computers may, by digital computation, cross-correlate a first signal and a second signal, where the first signal is a digital signal that encodes the pixel measurements of incident light and the second signal is a digital signal that encodes a reference signal. Alternatively, in some cases: (a) a pixel (such as a pixel that includes an avalanche diode, avalanche transistor, single-photon avalanche diode, or avalanche detector) may output digital data regarding light incident on the pixel; and (b) one or computers may, by digital computation, cross-correlate a first signal and a second signal, where the first signal is a digital signal that encodes the pixel measurements of incident light and the second signal is a digital signal that encodes a reference signal.

In illustrative implementations, the light signal and reference signal are multiplicatively mixed, and the product of this mixing is integrated over time. For example, the integration may comprise charge accumulating in a storage device (e.g., floating region, floating diffusion or capacitor). In some case, the integration may sum charge that has accumulated during multiple frames, subframes or exposures at a given modulation frequency.

In many implementations, for each given modulation frequency, the reference signal that is applied to the pixel has the same phase as—or has a constant phase difference with—amplitude modulation of light at the light source. Each example that is mentioned in this Cross-Correlation section may be implemented in this manner (i.e., such that, for each given modulation frequency, the reference signal applied to the pixel has the same phase as—or has a constant phase difference with—amplitude modulation of light at the light source.)

In some implementations, values of the two signals that are being cross-correlated may be treated as unitless during cross-correlation. For example: (a) units of irradiance for a light signal may be different than units of voltage for a reference signal; (b) during cross-correlation, the values of the reference signal and measured values of the incident light may be treated as unitless.

In illustrative implementations: (a) each cross-correlation operation results in a scalar value; and (b) this scalar value is a cross-correlation taken while both the reference signal and amplitude modulation by the light source are each at a given temporal frequency, which given temporal frequency has units of cycles per unit of time (e.g., Hertz). In illustrative implementations of this invention: (a) a vector of cross-correlation measurements is taken for a pixel during a sweep of modulation frequency of light; (b) this vector encodes a discrete-valued signal indexed over temporal frequency (cycles/unit of time), since each measurement is indexed at a given temporal frequency (i.e., at a given modulation frequency of both the emitted amplitude-modulated light and the reference signal); (c) the primal domain of the signal is temporal frequency; (e) the dual domain of the signal is a frequency domain transform of the signal; (f) the dual domain of the signal has units of time; and (g) a frequency in the dual domain of the signal is a dual frequency that has units of time.

In illustrative implementations, the operation of each respective camera pixel is directly or indirectly controlled, at least in part, by an electrical reference signal that has two Boolean states (high and low). In some cases, the state of a pixel depends on the state of the reference signal (e.g., whether the reference signal is then high or low). Alternatively, in some cases, changes in state of the pixel are triggered by transitions in state of the reference signal (such as by a rising edge or a falling edge). For example, in some cases, a rising edge or falling edge of the reference signal may trigger transfer of charge in the pixel, or may trigger a change in a voltage gradient in a pixel, or may trigger read-out. In some cases, the taking of cross-correlation measurements by a pixel may be controlled by the state (high or low) of the reference signal, or by a transition in state of the reference signal. The electrical reference signal may directly or indirectly control the state of one or more signals (such as voltage signals at different transistors or circuit nodes) that control operation of the pixel. The electrical reference signal may directly or indirectly control the state of one or more hardware components (e.g., photogates, transfer gates, reset gates, selection gates, or transistors) that control operation of the pixel.

As noted above, in illustrative implementations of this invention, analog or digital computation of cross-correlation may be performed by existing technology. For example, the existing technology may comprise any combination of one or more items (including hardware, methods or steps) that comprise any Listed Hardware (as defined herein), any Patent Hardware (as defined herein) or any Patent Processes (as defined herein).

In some implementations of this invention, one or more items of Listed Hardware (as defined herein) may perform an analog or digital cross-correlation measurement. For example, one or more items of Listed Hardware may perform one or more of Analog Steps A-G, described above. Here are some non-limiting examples: (1) in Analog Step A, the reference signal may directly or indirectly control one or more transistors or amplifiers that control gain; (2) in Analog Steps B and C, the reference signal may directly or indirectly control voltages at one or more gates, drains, sources, bases, collectors, emitters, pins, electrodes or circuit nodes or may directly or indirectly control a voltage gradient in a n-doped or p-doped semiconductor, and may thereby control accumulation or movement of optically-generated electric charge carriers in an n-doped or p-doped semiconductor; (3) in Analog Step D, the reference signal may directly or indirectly control transfer, storage, readout (or drain, discharge or reset without read-out) of electric charge carriers, by controlling operation of one or more transistors, transfer gates, reset gates, selection gates or other gates; (4) in Analog Step E, the reference signal may directly or indirectly control to which storage devices charge carriers are transferred, by controlling operation of one or more transfer gates, reset gates, selection gates or other gates or by controlling voltages applied to one or more transistors, gates, drains, sources, bases, collectors, emitters, pins, electrodes or circuit nodes; (5) in Analog Step E, the storage devices may comprise floating diffusions, floating regions, or capacitive storage devices; (6) in Analog Step F, the SLM pixel may be a pixel of a liquid crystal display; and (7) in Analog Step G, the SLM pixel may be a pixel of a DMD (digital micromirror device). The examples in the preceding sentence are non-limiting.

In some implementations of this invention, hardware that comprises Patent Hardware (as defined herein) may perform an analog or digital cross-correlation measurement, by performing one or more Patent Processes (as defined herein). Also, in some implementations of this invention, hardware that comprises Patent Hardware may perform one or more of Analog Steps A-G, by performing one or more Patent Processes.

In some implementations of this invention, a combination of one or more items of Patent Hardware or Listed Hardware apply an electrical reference signal to a pixel to directly or indirectly control one or more operations of the pixel. In some implementations of this invention, one or more Patent Processes apply an electrical reference signal to a pixel to directly or indirectly control one or more operations of the pixel. For example, the one or more items of Patent Hardware or Listed Hardware (or the one or more Patent Processes) may cause the electrical reference signal: (a) to directly or indirectly control the state of one or more signals (such as voltage signals at different transistors or circuit nodes) that control one or more operations of the pixel; or (b) directly or indirectly control the state of one or more hardware components (e.g., photogates, transfer gates, reset gates, selection gates, or transistors) that control one or more operations of the pixel.

Software

In some implementations of this invention, a computer executes the following Matlab® code, in order to process data acquired by a single pixel during a sweep of the modulation frequency:

```
% Input parameters
f = 50; % Input data captured at 50Mhz bandwidth (for example)
N = 2048; % 2048-point fft
% FFT on raw_data input
```

-continued

```
fft_ = 1/length(raw_data) * fft(raw_data, N); % Perform N-point fft
% Sort frequency components
spec = abs(fft_(0:N/2+1)); % one-sided power spectrum
[spec_sorted, I] = sort(spec, 'descend');
f_axis = f*(0:N/2)/N;
% Convert to depth
fundamental = f_axis(I(2)); % Exclude DC
depth = (fundamental./(4*pi))*3e8
```

The above Matlab® software encodes an algorithm. This algorithm takes, as an input, a vector of readout values (cross-correlation measurements) acquired by a single pixel at different modulation frequencies during a sweep of the modulation frequency. In this algorithm, the range of modulation frequencies in the sweep is 50 MHz (i.e., the difference between the highest and lowest modulation frequencies in the sweep is 50 MHz). The algorithm computes an FFT on this input vector to compute a power spectrum. This algorithm finds the dual frequency in the power spectrum that has the maximum amplitude (excluding the DC component). To do this, the algorithm sorts the power spectrum by amplitude, and picks the dual frequency at the second-highest peak of the power spectrum (since DC would be the highest). Then, the algorithm computes depth of a scene point that corresponds to the pixel. To do so, the algorithm divides this dual frequency by 4*pi and multiplies by the speed of light.

The above Matlab® software (and algorithm that it encodes) are a non-limiting example. Other software and other algorithms may be employed in this invention.

Computers

In illustrative implementations of this invention, one or more computers (e.g., servers, network hosts, client computers, integrated circuits, microcontrollers, controllers, field-programmable-gate arrays, personal computers, digital computers, or analog computers) are programmed or specially adapted to perform one or more of the following tasks: (1) to control the operation of, or interface with, hardware components of a ToF camera, including any light sensor; sensor array; light source, laser diode, laser driver, LED, LED driver; FGPA, PLL, lock-in pixel, PMD pixel, sensor pixel, or ADC; (2) to output a clock signal, including to synchronize (i) amplitude modulation of light with (ii) a reference signal applied to pixels in a sensor; (3) to multiplicatively mix two signals; (4) to integrate; (5) to cross-correlate two signals; (6) to perform an FFT (fast Fourier transform on a vector of cross-measurements acquired by a pixel during a sweep of modulation frequency of light illuminating a scene; (7) to identify a dual frequency (e.g., at second-highest peak) in a power spectrum and to calculate, based on this dual frequency, depth or path length; (8) to identify a dual frequency of a discrete-valued function encoded by a vector of cross-correlation measurements; (9) to perform any other calculation, computation, program, algorithm, or computer function described or implied above; (10) to receive signals indicative of human input; (11) to output signals for controlling transducers for outputting information in human perceivable format; and (11) to process data, to perform computations, to execute any algorithm or software, and to control the read or write of data to and from memory devices (items 1-12 of this sentence referred to herein as the "Computer Tasks"). For example, some of the computers may comprise one or more pixels (e.g., lock-in pixels or PMD pixels) that perform an analog computation of cross-correlation. For example, the computers may include pixel 804 or a pixel shown in FIGS. 8 and 9, each of which perform an analog computation of cross-correlation. The one or more computers (e.g. 721, 711, 804) may be in any position or positions within or outside of the camera. For example, in some cases (a) at least one computer is housed in or together with other components of the camera, such as a light source or light sensor, and (b) at least one computer is remote from other components of the camera. The one or more computers may communicate with each other or with other components of the camera either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., 703, 707, 711, 717, 719, 721, 723, 804) may be configured for wireless or wired communication with other electronic devices in a network.

For example, in some cases, one or more electronic devices (e.g., 703, 707, 711, 717, 719, 721, 804) may each include a wireless communication module for wireless communication with other electronic devices in a network. Each wireless communication module may include (a) one or more antennas, (b) one or more wireless transceivers, transmitters or receivers, and (c) signal processing circuitry. Each wireless communication module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 721, 711, 804) may be programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and any mobile phone standard), or other IEEE communication standard.

Comparison to Conventional Phase-ToF Depth Ranging

The following discussion highlights some differences between (a) a frequency domain time-of-flight camera (FD-ToF camera), in an illustrative implementation of this invention, and (b) a conventional phase-ToF camera.

A conventional phase-ToF camera emit extracts optical path length (and thus scene depth) from a phase difference between emitted and received light. Many conventional phase-ToF cameras employ "four-bucket" sampling, in which: (a) four measurements $m_0$, $m_1$, $m_2$, and $m_3$, are taken while a reference signal is shifted in phase increments of 90 degrees; and (b) phase $\varphi$ is computed according to $\varphi=\arctan(m_3-m_1)/(m_0-m_2)$. As noted above, conventional phase-ToF sensing suffers from at least three technological problems: (a) phase-wrapping; (b) multi-path interference; and (c) inaccuracy in low SNR environments. Conventional phase-ToF do not analyze a cross-correlation signal in a frequency domain.

In illustrative implementations of this invention, these three problems with phase-ToF cameras may be avoided. For example, in illustrative implementations of this invention, these three problems may be avoided by analyzing cross-correlation in a frequency domain, identifying a dual frequency due to light traveling on a given path, and based on this dual frequency computing optical path length for the given path.

In many implementations of this invention: (a) an active light source in the camera may emit pulsed (strobed) illumination, rather than continuous-wave illumination; and (b) thus the active lighting may be different than the continuous-wave illumination employed in conventional phase-ToF sensing. (Alternatively, some implementations of this invention employ continuous-wave illumination. For example, in some implementations of this invention, a laser operating in continuous-wave mode may emit amplitude-modulated light).

In many implementations of this invention (unlike many conventional phase ToF sensors), the phase of the reference signal is not shifted in 90 degree increments while samples are taken at these different phase increments (although this may be done, in some cases). Instead, in many implementations of this invention, for any given modulation frequency, the phase and temporal frequency of the reference signal may be held constant relative to the phase and temporal frequency, respectively, of amplitude modulation of light by the light source.

DEFINITIONS

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

As used herein, "amplitude modulation by a light source" means amplitude modulation, by the light source, of light that is emitted by the light source.

To say that a frequency is "at" a peak of a power spectrum means that the peak occurs at the frequency.

To compute "based on" specified data means to perform a computation that takes the specified data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; (j) a lock-in pixel camera; (k) a PMD pixel camera; and (l) a depth camera. A camera includes any computers or circuits that process data captured by the camera.

"Carrier frequency" is defined above.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

As used herein, to say that X "controls" Y does not imply that Y is controlled only by X. For example, X may "control" Y even if: (a) X is only one of the factors that, taken together, control Y; or (b) X controls only a portion of Y or only a portion of Y's operation.

As used herein, to say that a scene point "corresponds" to a pixel of a camera means that light which reflects from the scene point is focused at the pixel. As used herein, to say that an SLM pixel "corresponds" to a camera pixel means that the SLM is positioned such that light passes through (or is reflected from) the SLM pixel before reaching the camera pixel.

"Defined Term" means a term or phrase that is set forth in quotation marks in this Definitions section.

"Dual frequency" is defined above.

For an event to occur "during" a time period, it is not necessary that the event occur throughout the entire time period. For example, an event that occurs during only a portion of a given time period occurs "during" the given time period.

The term "e.g." means for example.

Each equation above is referred to herein by the equation number set forth to the right of the equation. For example: "Equation 1" means Equation 1 above; and. "Equation 4" means Equation 4 above. Non-limiting examples of an equation are: (a) an equation; (b) an in equation (which states an inequality, e.g., that a first item is greater than or less than a second item); and (c) a mathematical statement of proportionality or inverse proportionality.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

To say that a cross-correlation measurement is taken "for" a pixel means that: (a) the pixel measures light incident on the pixel; and (b) a cross-correlation of the incident light and an electrical reference signal is computed, either by the pixel or by a computer based on measurements taken by the pixel. As a non-limiting example, in the preceding sentence, computation by the pixel may comprise analog computation. To say that a vector of cross-correlation vectors is taken "for" a pixel means a vector of measurements is taken, where each measurement in the vector is a cross-correlation measurement taken in the manner described in the first sentence of this paragraph.

"For instance" means for example.

A non-limiting example of a "frame" is a set of measured data about a scene that is captured by a camera during a single time period or single exposure, even if (i) the data is not humanly perceptible, or (ii) there is not a one-to-one mapping between the data and the scene being imaged.

In the context of a camera (or components of the camera), "front" is optically closer to the scene being imaged, and "rear" is optically farther from the scene, during normal operation of the camera To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

To say that a calculation is "in accordance with" a first equation means that the calculation includes (a) solving the first equation or computing a value of a side of the first equation; or (b) solving a second equation or computing a value of a side of the second equation, where the second equation is derived from the first equation, such as by algebraic manipulation of the first equation or by performing the same mathematical operation(s) on both sides of the first equation. Non-limiting examples of "solving" an equation include solving the equation in closed form or by numerical approximation.

The term "include" (and grammatical variations thereof) shall be construed as if followed by "without limitation".

Non-limiting examples of "integration" are (a) to perform integration in the calculus sense, (b) to sum (by analog computation) samples acquired during an interval of time or acquired over a spatial region; (c) to sum (by digital computation) data representing measurements acquired during an interval of time or acquired over a spatial region; (d) to accumulate optically-generated electric charge carriers during an exposure period; or (e) to read-out such accumulated charge carriers.

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"Listed Patents" means U.S. Pat. No. 6,777,659; U.S. Pat. No. 6,825,455; U.S. Pat. No. 7,012,738; U.S. Pat. No. 8,294,882; U.S. Pat. No. 6,323,942; U.S. Pat. No. 6,515,740; U.S. Pat. No. 6,587,186; U.S. Pat. No. 7,405,812; U.S. Pat. No. 7,719,662; U.S. Pat. No. 8,194,233; U.S. Pat. No. 8,314,924; U.S. Pat. No. 8,953,149; U.S. Pat. No. 6,678,039; U.S. Pat. No. 7,060,957; U.S. Pat. No. 7,636,150; U.S. Pat. No. 8,786,678; U.S. Pat. No. 7,361,883; U.S. Pat. No. 7,408,627; U.S. Pat. No. 9,516,244; U.S. Pat. No. 7,671,391; U.S. Pat. No. 7,262,402; and U.S. Pat. No. 8,355,117. A "Listed Patent" means one of the Listed Patents. The entire disclosure of each of the Listed Patent is hereby incorporated by reference herein. The entire disclosure of a Listed Patent includes the specification and drawings of the Listed Patent, but does not include the patent claims of the Listed Patent.

"Listed Hardware" means any or more of the following: CMOS pixel; CMOS camera; CCD (charge-coupled device); CCD array; CCD camera; lock-in pixel; lock-in-ToF camera; PMD (photonic mixer device); PMD pixel; PMD ToF camera; n-type semiconductor; p-type semiconductor; transistor; n-channel transistor; p-channel transistor; n-p-n transistor; p-n-p transistor; BJT (bipolar junction transistor); FET (field-effect transistor); unipolar transistor; JFET (junction gate field-effect transistor); MOSFET (metal-oxide-semiconductor field-effect transistor); MESFET (metal-semiconductor field-effect transistor); IGFET (insulated gate field-effect transistor) HEMT (high-electron-mobility transistor); ITFET (inverted-T field-effect transistor); CNFET (carbon nanotube field-effect transistor); FinFET (fin field-effect transistor); diffusion transistor; diode; photodiode; photogate; photoresistor; photoconductor; source, gate, drain, body, semiconductor substrate; base; emitter; collector; transfer gate; reset gate; selection gate; operational amplifier; solid-state switch; solid-state amplifier; solid-state component; inductor; capacitor; resistor; conductor; wire; bus; port; pin; capacitive storage device; floating region; floating diffusion; OTA (operational transconductance operator); gyrator; oscillator; PLL (phase-locked loop); integrated chip; reverse-biased LED (light-emitting diode); LCD (liquid-crystal display); DMD (digital micromirror device); computer; analog computer; digital computer; computer bus; computer port; network connection; network interface device; host adapter; wireless module; wireless card; signal processor; modem; router; cable; wiring; avalanche photodiode; and single photon avalanche photodiode.

As used herein, (i) a single scalar is not a "matrix", and (ii) one or more entries, all of which are zero (i.e., a so-called null matrix), is not a "matrix".

"Modulation frequency" is defined above.

The terms "multi-bounce path" and "multi-bounce light" are defined in the Detailed Description section, above.

To "multiply" includes to multiply by an inverse. Thus, to "multiply" includes to divide.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Patent Hardware" means any hardware mentioned, listed, or described in any Listed Patent, or any component of such hardware.

"Patent Process" means: (a) any process or method mentioned, listed, or described in any Listed Patent; or (b) any step, substep or set of steps in any process or method mentioned, listed, or described in any Listed Patent.

Unless the context clearly indicates otherwise, "path length" means optical path length.

Unless the context clearly indicates otherwise, "pi" means the mathematical constant that is equal to the ratio of a circle's circumference to the circle's diameter. For example, pi may be approximated as 3.14159.

"PMD" means photonic mixer device.

As used herein, the term "set" does not include a group with no elements. Mentioning a first set and a second set does not, in and of itself, create any implication regarding whether or not the first and second sets overlap (that is, intersect).

"Scene point" means a point in a scene.

The terms "single-bounce path" and "single-bounce light" are defined in the Detailed Description section, above.

Unless the context clearly indicates otherwise, "some" means one or more.

"Spatial light modulator" and "SLM" each mean a device (i) that transmits light through the device or reflects light from the device, and (ii) that causes a modulation of the intensity, frequency, phase or polarization state of light transmitted through or reflected from the device, such that the modulation depends on the spatial position at which the light is incident on the device. Non-limiting examples of an SLM include an LCD (liquid-crystal display) and a DMD (digital micromirror device).

Unless the context clearly indicates otherwise, "speed of light" means speed of light in a vacuum.

As used herein, a "subset" of a set consists of less than all of the elements of the set.

"Substantially" means at least ten percent. For example: (a) 112 is substantially larger than 100; and (b) 108 is not substantially larger than 100.

To say that X is "substantially constant" throughout a period means that X has a value that is always within a single range during the period, such that: (a) the lowest value in the range is equal to a constant number minus ten percent of the constant number; (b) the highest value in the range is equal to the constant number plus ten percent of the constant number; and (c) the lowest and highest values of the range do not change during the period.

The term "such as" means for example.

To say that a first signal is "synchronized" with a second signal throughout a period means that, throughout the period: (a) the phase and frequency of the first signal is the same (or substantially the same) as the phase and frequency, respectively, of the second signal; or (b) the difference between the phase of the first signal and the phase of the second signal is constant (or substantially constant) throughout the period.

As used herein, the term "sweep" of frequencies does not imply any order of frequencies or direction of change in frequency. Here are some non-limiting examples: (a) a "sweep" may be from highest to lowest frequency, or from lowest to highest frequency; (b) frequencies in a "sweep" may be monotonically increasing, monotonically decreasing, monotonically weakly decreasing, monotonically weakly increasing or none of the above; (c) a given frequency may repeat more than once in a sweep, either consecutively or separated by one or more other frequencies; and (d) in a sweep of frequencies which includes a highest frequency, a middle frequency and a lowest frequency, these frequencies may occur in any order, such as middle, then highest, then lowest.

"Temporal frequency" is defined above.

"ToF" means time-of-flight.

To say that a machine-readable medium is "transitory" means that the medium is a transitory signal, such as an electromagnetic wave.

As used herein, "vector" means a one-dimensional array. (Without affecting this definition in any way, we note that this meaning is common in computer science).

A matrix may be indicated by a bold capital letter (e.g., D). A vector may be indicated by a bold lower case letter (e.g., α). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

VARIATIONS

This invention may be implemented in many different ways. Here are some non-limiting examples:

In some implementations of this invention, a full-field camera computes an inner product between a time-varying strobing signal and a time-varying reference signal in a manner that allows modulation frequencies of the two signals to vary over time. For example, this may be accomplished by using an ordinary camera with a binary LCD mask (in front of the camera) synchronized to a strobing light source.

In some implementations of this invention, a ToF imaging system may comprise (a) a multi-pixel light sensor, (b) one or more light sources that are configured to emit amplitude-modulated light and to sweep the modulation frequency of the light over three or more modulation frequencies, and (c) one or more computers. In this example, the one or more computers may be programmed to control the light source(s) and light sensor such that (a) exposure (e.g., accumulation of electric charge in each sensor pixel in response to incident light) is precisely controlled by a reference signal, and (b) for each given modulation frequency, the reference signal has a phase that is the same as (or has a constant phase difference relative to) the phase of the modulation signal that controls the emission of amplitude-modulated light by the light sources. In this example, the system may be configured such that a cross-correlation is effectively taken for each sensor pixel. In this example, the cross-correlation for a pixel may be performed by analog computation by the pixel itself, or by digital post-processing calculations by the one or more computers. In this example, the cross-correlation may be a cross-correlation of (a) a modulation signal applied to pixels of the light sensor and (b) a modulation signal that controls amplitude modulation of light emitted by the light sources. In this example, for each sensor pixel, the one or more computers may be programmed to perform computations that: (a) accept as an input a vector of cross-correlation measurements taken by the pixel during a sweep of modulation frequency, and (b) compute path length of light striking the pixel (or depth of a scene point corresponding to the pixel) based on a dual frequency (or dual frequencies) of a discrete-valued signal that is encoded by the vector.

In some implementations, this invention is a method comprising: (a) emitting amplitude-modulated light that illuminates a scene, and varying modulation frequency of the light in a sweep of modulation frequency that includes three or more modulation frequencies; and (b) for each respective pixel in a set of pixels in a camera (i) applying an electrical reference signal to the respective pixel, (ii) taking a vector of cross-correlation measurements, such that for each given modulation frequency in the sweep the vector includes one or more cross-correlation measurements, each measurement comprising a cross-correlation of the reference signal and a signal comprising light incident on the respective pixel, (iii) performing spectral analysis of a discrete-valued signal encoded by the vector, which spectral analysis identifies a dual frequency of the discrete-valued signal, and (iv) calculating, based on the dual frequency (A) optical path length of a path along which light travels to the respective pixel, or (B) depth of a scene point that corresponds to the respective pixel. In some cases, performing the spectral analysis includes performing a fast Fourier transform. In some cases: (a) the fast Fourier transform outputs a power spectrum, which power spectrum has at least two peaks; and (b) the dual frequency occurs at the second highest peak in the power spectrum. In some cases, the calculating includes setting the depth equal to a fraction, where the numerator is speed of light times the dual frequency and the denominator is four times pi. In some cases, the calculating includes setting the optical path length equal to a fraction, where the numerator is speed of light times the dual frequency and the denominator is two times pi. In some cases, for each respective pixel in the set of pixels: (a) the spectral analysis identifies a set of one or more dual frequencies of the vector; (b) each respective dual frequency in the set of dual frequencies corresponds to a given path along which light travels to the respective pixel; and (c) for each respective dual frequency in the set of dual frequencies, the calculating includes setting the optical path length of the given path equal to a fraction, where the numerator is speed of light times the respective dual frequency and the denominator is two times pi. In some cases: (a) the sweep has a bandwidth, which bandwidth is equal to the difference between the highest and lowest modulation frequencies in the sweep; and (b) the method has an optical path length resolution such that a first optical path length and a second optical path length are resolvable by the method when the difference between the first and second optical path lengths is greater than a fraction, which fraction has a numerator equal to 1.206 times speed of light and a denominator equal to the bandwidth. In some cases: (a) the sweep has a bandwidth, which bandwidth is equal to the difference between the highest and lowest modulation frequencies in the sweep; and (b) the method has a depth resolution such that a first depth and a second depth are resolvable by the method when the difference between the first and second depths is greater than a fraction, which fraction has a numerator equal to 0.603 times speed of light and a denominator equal to the bandwidth; and (c) the first and second depths are each a depth of a scene point. In some cases, the optical path length or the depth are computed in accordance with the formula $$\mathcal{F}[c(\tau, f_M)](\kappa) \propto \delta(\kappa) + \delta\left(\kappa \pm \frac{2\pi z}{c}\right),$$

where: (1) $f_M$ is modulation frequency of amplitude-modulated light; (2) $c(\tau, f_M)$ is cross-correlation of a first signal and a second signal, where the first signal is light incident on a pixel and the second signal is an electrical reference signal that is applied to the pixel, and where $\tau$ is lag between the first and second signals and where $f_M$ is temporal frequency of the first and second signals; (3) $\mathcal{F}$ [•] is the discrete Fourier transform operator; (4) $\delta$ (•) is the Dirac delta function; (5) c is speed of light; (6) $\kappa$ is dual frequency in a Fourier domain version of $c(f_M)$; and (7) $\propto$ means "is proportional to". In some cases, at all times while the vector of cross-correlation measurements for a given modulation frequency is being taken, the phase and temporal frequency of the emitted amplitude-modulated light is substantially the same as the phase and temporal frequency, respectively, of the reference signal. In some cases, at all times while the vector of cross-correlation measurements for a given modulation frequency is being taken, a phase difference is substantially constant, which phase difference is the difference between phase of emitted amplitude-modulated light and phase of the reference signal. In some cases, the light is incoherent before reaching the scene. Each of the cases described above in this paragraph is an example of the method described in the first sentence of this paragraph, and is also an example of an embodiment of this invention that may be combined with other embodiments of this invention.

In some implementations, this invention is an apparatus comprising: (a) means for emitting amplitude-modulated light that illuminates a scene, and for varying modulation frequency of the light in a sweep of modulation frequency that includes three or more modulation frequencies; and (b) means for applying an electrical reference signal to each respective pixel in a set of pixels in a camera; (c) means for taking a vector of cross-correlation measurements for each respective pixel in the set of pixels, such that for each given modulation frequency in the sweep the vector includes one or more cross-correlation measurements, each measurement comprising a cross-correlation of the reference signal and a signal comprising light incident on the respective pixel; and (d) one or more computers that are programmed, for each respective pixel in the set of pixels (i) to perform spectral analysis of a discrete-valued signal encoded by the vector for the respective pixel, which spectral analysis identifies a dual frequency of the discrete-valued signal, and (ii) to calculate, based on the dual frequency (A) optical path length of a path along which light travels to the respective pixel, or (B) depth of a scene point that corresponds to the respective pixel. Each of the cases described above in this paragraph is an example of the apparatus described in the first sentence of this paragraph, and is also an example of an embodiment of this invention that may be combined with other embodiments of this invention.

In some implementations, this invention is an apparatus comprising: (a) a light source; (b) a camera; and (c) one or more computers (i) that are programmed (A) to output one or more signals that control amplitude modulation of light emitted by the light source and that control a reference signal that is applied to a set of pixels of the camera, and (B) to control the camera to take a vector of cross-correlation measurements for each respective pixel in the set of pixels, such that for each given modulation frequency in the sweep the vector includes one or more cross-correlation measurements, each measurement comprising a cross-correlation of the reference signal and a signal comprising light incident on the respective pixel, and (ii) that are also programmed, for each respective pixel in the set of pixels (A) to perform spectral analysis of a discrete-valued signal encoded by the vector for the respective pixel, which spectral analysis identifies a dual frequency of the discrete-valued signal, and (B) to perform an algorithm that calculates, based on the dual frequency (1) optical path length of a path along which light travels to the respective pixel, or (2) depth of a scene point that corresponds to the respective pixel. In some cases: (a) the spectral analysis comprises a fast Fourier transform; (b) the fast Fourier transform outputs a power spectrum, which power spectrum has at least two peaks; and (c) the dual frequency is located at the second highest peak in the power spectrum. In some cases, the algorithm includes setting the depth equal to a fraction, where the numerator is speed of light times the dual frequency and the denominator is four times pi. In some cases, the algorithm includes setting the optical path length equal to a fraction, where the numerator is speed of light times the dual frequency and the denominator is two times pi. In some cases, for each respective pixel in the set of pixels: (a) the spectral analysis identifies a set of one or more dual frequencies of the vector; (b) each respective dual frequency in the set of dual frequencies corresponds to a given path along which light travels to the respective pixel; and (c) for each respective dual frequency in the set of dual frequencies, the calculating includes setting the optical path length of the given path equal to a fraction, where the numerator is speed of light times the respective dual frequency and the denominator is two times pi. In some cases: (a) the sweep has a bandwidth, which bandwidth is equal to the difference between the highest and lowest modulation frequencies in the sweep; and (b) the camera has an optical path length resolution such that a first optical path length and a second optical path length are resolvable by the camera when the difference between the first and second optical path lengths is greater than a first fraction, which first fraction has a numerator equal to 1.206 times speed of light and a denominator equal to the bandwidth. In some cases, the light source is configured to emit incoherent light. Each of the cases described above in this paragraph is an example of the apparatus described in the first sentence of this paragraph, and is also an example of an embodiment of this invention that may be combined with other embodiments of this invention.

Each description above of any method or apparatus of this invention describes a non-limiting example of this invention. This invention is not limited to those examples, and may be implemented in other ways.

Each description above of any implementation, embodiment or case of this invention (or any use scenario for this invention) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The Provisional Application does not limit the scope of this invention. The Provisional Application describes non-limiting examples of this invention, which examples are in addition to—and not in limitation of—the implementations of this invention that are described in the main part of this document. For example, if any given feature described in the Provisional Application is different from, or in addition to, the features described in the main part of this document, this additional or different feature of the Provisional Application does not limit any implementation of this invention described in the main part of this document, but instead merely describes another example of this invention. As used herein, the "main part of this document" means this entire document (including any drawings listed in the Brief Description of Drawings above), except that the "main part of this document" does not include paragraph [0001] of this document which paragraph is titled "Related Applications".

Any document that is incorporated by reference herein ("incorporated document") does not limit the scope of this invention (including the scope of any hardware, hardware component, method, process, step, software, algorithm, feature, or technology that is described in the main part of this document). For example, if any given feature described in any incorporated document is different from, or in addition to, the features described in the main part of this document, this additional or different feature of the incorporated document does not limit any implementation of this invention described in the main part of this document.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

What is claimed is:

1. A method comprising:
   (a) emitting amplitude-modulated light that illuminates a scene and varying modulation frequency of the light in a sweep of modulation frequency that includes three or more modulation frequencies;
   (b) applying an electrical reference signal to a set of pixels in a camera and varying frequency of the reference signal in such a way that frequency of the reference signal is equal to modulation frequency of the light at each of the modulation frequencies of the sweep; and
   (c) for each respective pixel in the set of pixels
      (i) outputting a vector of cross-correlations measured by the respective pixel at different modulation frequencies during the sweep, in such a way that, for each given modulation frequency in the sweep, the vector includes a measured cross-correlation of the reference signal and of a signal comprising reflected light, which reflected light is at the given modulation frequency and is incident on the respective pixel after reflecting from the scene,
      (ii) performing spectral analysis of a discrete-valued signal encoded by the vector, which spectral analysis computes a dual frequency of the discrete-valued signal, and
      (iii) calculating, based on the dual frequency
         (A) optical path length of a path along which light travels to the respective pixel, or
         (B) depth of a scene point that corresponds to the respective pixel.

2. The method of claim 1, wherein performing the spectral analysis includes performing a fast Fourier transform.

3. The method of claim 2, wherein:
   (a) the fast Fourier transform outputs a power spectrum, which power spectrum has at least two peaks; and
   (b) the dual frequency occurs at the second highest peak in the power spectrum.

4. The method of claim 3, wherein the calculating includes setting the depth equal to a fraction, where the numerator is speed of light times the dual frequency and the denominator is four times pi.

5. The method of claim 3, wherein the calculating includes setting the optical path length equal to a fraction, where the numerator is speed of light times the dual frequency and the denominator is two times pi.

6. The method of claim 1, wherein for each respective pixel in the set of pixels:
   (a) the spectral analysis identifies a set of one or more dual frequencies of the vector;
   (b) each respective dual frequency in the set of dual frequencies corresponds to a given path along which light travels to the respective pixel; and
   (c) for each respective dual frequency in the set of dual frequencies, the calculating includes setting the optical path length of the given path equal to a fraction, where the numerator is speed of light times the respective dual frequency and the denominator is two times pi.

7. The method of claim 6, wherein:
   (a) the sweep has a bandwidth, which bandwidth is equal to the difference between the highest and lowest modulation frequencies in the sweep; and
   (b) the method has an optical path length resolution such that a first optical path length and a second optical path length are resolvable by the method when the difference between the first and second optical path lengths is greater than a fraction, which fraction has a numerator equal to 1.206 times speed of light and a denominator equal to the bandwidth.

8. The method of claim 1, wherein:
(a) the sweep has a bandwidth, which bandwidth is equal to the difference between the highest and lowest modulation frequencies in the sweep; and
(b) the method has a depth resolution such that a first depth and a second depth are resolvable by the method when the difference between the first and second depths is greater than a fraction, which fraction has a numerator equal to 0.603 times speed of light and a denominator equal to the bandwidth; and
(c) the first and second depths are each a depth of a scene point.

9. The method of claim 1, wherein the optical path length or the depth are computed in accordance with the formula $$\mathcal{F}[c(\tau, f_M)](\kappa) \propto \delta(\kappa) + \delta\left(\kappa \pm \frac{2\pi z}{c}\right),$$

where: (1) $f_M$ is modulation frequency of amplitude-modulated light; (2) $c(\tau, f_M)$ is cross-correlation of a first signal and a second signal, where the first signal is light incident on a pixel and the second signal is an electrical reference signal that is applied to the pixel, and where $\tau$ is lag between the first and second signals and where $f_M$ is temporal frequency of the first and second signals; (3) $\mathcal{F}[\cdot]$ is the discrete Fourier transform operator; (4) $\delta(\cdot)$ is the Dirac delta function; (5) c is speed of light; (6) $\kappa$ is dual frequency in a Fourier domain version of $c(f_M)$; and (7) $\propto$ means "is proportional to".

10. The method of claim 1, wherein, at all times while cross-correlation for a given modulation frequency is being measured, the phase and temporal frequency of amplitude modulation of the emitted amplitude-modulated light is substantially the same as the phase and temporal frequency, respectively, of the reference signal.

11. The method of claim 1, wherein, at all times while cross-correlation for a given modulation frequency is being measured, a phase difference is substantially constant, which phase difference is the difference between phase of amplitude modulation of emitted amplitude-modulated light and phase of the reference signal.

12. The method of claim 1, wherein the light is incoherent before reaching the scene.

13. Apparatus comprising:
(a) means for emitting amplitude-modulated light that illuminates a scene, and for varying modulation frequency of the light in a sweep of modulation frequency that includes three or more modulation frequencies;
b) means for applying an electrical reference signal to a set of pixels in a camera;
(c) means for outputting, for each respective pixel in the set of pixels, a vector of cross-correlations measured by the respective pixel at different modulation frequencies during the sweep, in such a way that, for each given modulation frequency in the sweep, the vector includes a measured cross-correlation of the reference signal and of a signal comprising reflected light, which reflected light is at the given modulation frequency and is incident on the respective pixel after reflecting from the scene; and
(d) one or more computers that are programmed, for each respective pixel in the set of pixels
(i) to perform spectral analysis of a discrete-valued signal encoded by the vector for the respective pixel, which spectral analysis computes a dual frequency of the discrete-valued signal, and
(ii) to calculate, based on the dual frequency
(A) optical path length of a path along which light travels to the respective pixel, or
(B) depth of a scene point that corresponds to the respective pixel.

14. Apparatus comprising:
(a) a light source;
(b) a camera; and
(c) one or more computers
(i) that are programmed
(A) to output one or more signals that (I) control amplitude modulation of light emitted by the light source, (II) control an electrical reference signal that is applied to a set of pixels of the camera, (III) cause modulation frequency of the light to vary in a sweep of modulation frequency that includes three or more modulation frequencies, and (IV) cause frequency of the reference signal to vary in such a way that frequency of the reference signal is equal to modulation frequency of the light at each of the modulation frequencies of the sweep, and
(B) to control a set of pixels in the camera in such a way that (I) each respective pixel in the set of pixels outputs a vector of cross-correlations measured by the respective pixel at different frequencies during the sweep, and (II) for each given modulation frequency in the sweep, the vector includes a measured cross-correlation of the reference signal and of a signal comprising reflected light, which reflected light is at the given modulation frequency and is incident on the respective pixel, and
(ii) that are also programmed, for each respective pixel in the set of pixels
(A) to perform spectral analysis of a discrete-valued signal encoded by the vector for the respective pixel, which spectral analysis computes a dual frequency of the discrete-valued signal, and
(B) to perform an algorithm that calculates, based on the dual frequency
(1) optical path length of a path along which light travels to the respective pixel, or
(2) depth of a scene point that corresponds to the respective pixel.

15. The apparatus of claim 14, wherein:
(a) the spectral analysis comprises a fast Fourier transform;
(b) the fast Fourier transform outputs a power spectrum, which power spectrum has at least two peaks; and
(c) the dual frequency is located at the second highest peak in the power spectrum.

16. The apparatus of claim 15, wherein the algorithm includes setting the depth equal to a fraction, where the numerator is speed of light times the dual frequency and the denominator is four times pi.

17. The apparatus of claim 15, wherein the algorithm includes setting the optical path length equal to a fraction, where the numerator is speed of light times the dual frequency and the denominator is two times pi.

18. The apparatus of claim 14, wherein for each respective pixel in the set of pixels:
(a) the spectral analysis identifies a set of one or more dual frequencies of the vector;

(b) each respective dual frequency in the set of dual frequencies corresponds to a given path along which light travels to the respective pixel; and (c) for each respective dual frequency in the set of dual frequencies, the calculating includes setting the optical path length of the given path equal to a fraction, where the numerator is speed of light times the respective dual frequency and the denominator is two times pi.

19. The apparatus of claim 18, wherein:

(a) the sweep has a bandwidth, which bandwidth is equal to the difference between the highest and lowest modulation frequencies in the sweep; and (b) the camera has an optical path length resolution such that a first optical path length and a second optical path length are resolvable by the camera when the difference between the first and second optical path lengths is greater than a first fraction, which first fraction has a numerator equal to 1.206 times speed of light and a denominator equal to the bandwidth.

20. The apparatus of claim 14, wherein the light source is configured to emit incoherent light.

* * * * *